United States Patent
Ergen et al.

(10) Patent No.: US 11,843,959 B2
(45) Date of Patent: Dec. 12, 2023

(54) METHOD AND SYSTEM FOR ENABLING LOW-LATENCY DATA COMMUNICATION BY AGGREGATING A PLURALITY OF NETWORK INTERFACES

(71) Applicant: Ambeent Wireless, Istanbul (TR)

(72) Inventors: Mustafa Ergen, Istanbul (TR); Mehmet Fatih Tuysuz, Istanbul (TR)

(73) Assignee: AMBEENT WIRELESS, Istanbul (TR)

( * ) Notice: Subject to any disclaimer, the term of this patent is extended or adjusted under 35 U.S.C. 154(b) by 276 days.

(21) Appl. No.: 17/083,938

(22) Filed: Oct. 29, 2020

(65) Prior Publication Data
US 2022/0141685 A1    May 5, 2022

(51) Int. Cl.
| | |
|---|---|
| *H04W 24/08* | (2009.01) |
| *H04W 28/24* | (2009.01) |
| *G06N 20/00* | (2019.01) |
| *G06F 9/48* | (2006.01) |
| *G06F 9/54* | (2006.01) |

(52) U.S. Cl.
CPC .......... *H04W 24/08* (2013.01); *H04W 28/24* (2013.01); *G06F 9/4881* (2013.01); *G06F 9/547* (2013.01); *G06N 20/00* (2019.01)

(58) Field of Classification Search
CPC ..... H04W 24/08; H04W 28/24; H04W 12/06; H04J 3/06; H04L 29/06; H04L 43/062
See application file for complete search history.

(56) References Cited

U.S. PATENT DOCUMENTS

| | | |
|---|---|---|
| 9,477,615 B1 | 10/2016 | Basson et al. |
| 9,769,684 B1 * | 9/2017 | Fiumano ............... H04W 24/06 |
| 2009/0292821 A1 | 11/2009 | Grib et al. |

(Continued)

OTHER PUBLICATIONS

Hurtig et al. "Low-latency scheduling in MPTCP ." IEEE/ACM Transactions on Networking 27.1 (2018): 302-315. Dec. 20, 2018 (Dec. 20, 2018) Retrieved on Dec. 28, 2021 (Dec. 28, 2021) from entire document.

(Continued)

*Primary Examiner* — Iqbal Zaidi
(74) *Attorney, Agent, or Firm* — CHIP LAW GROUP

(57) ABSTRACT

The invention generally relates to a method and system for enabling low-latency data communication by aggregating a plurality of network interfaces, each network interface associated with a different network. The method and system measures in real-time, network performance capabilities associated with the networks via the respective network interfaces. The method and system then assigns two or more multi-threading processors in a multi-processor architecture configured to execute a plurality of threads for processing one or more data streams. The threading in each processor is interlinked with two or more network interfaces based on the measured network performance capabilities and network performance capability requirements of the one or more data streams, thereby enabling threading-based cooperation among multi-core processors in the multi-processor architecture and the plurality of network interfaces. The one or more data streams are then transmitted to the two or more network interfaces and thereon to the associated networks for transport.

30 Claims, 18 Drawing Sheets

(56) References Cited

U.S. PATENT DOCUMENTS

| | | |
|---|---|---|
| 2010/0318703 A1 | 12/2010 | Zhu et al. |
| 2011/0149801 A1 | 6/2011 | Matityahu et al. |
| 2015/0382208 A1* | 12/2015 | Elliott .................. G06F 16/245 |
| | | 370/252 |
| 2018/0054485 A1 | 2/2018 | Warfield et al. |
| 2020/0220637 A1* | 7/2020 | Barry ....................... H04J 3/06 |

OTHER PUBLICATIONS

International Search Report and Written Opinion in PCT/US2021/056819 dated Feb. 3, 2022.

* cited by examiner

| Packet | Data/Function Output | QoS Requirement | Destination(s) |

FIG. 7

METHOD AND SYSTEM FOR ENABLING LOW-LATENCY DATA COMMUNICATION BY AGGREGATING A PLURALITY OF NETWORK INTERFACES

FIELD OF THE INVENTION

The invention generally relates to a method and system for enabling low-latency data transmission and reception in next generation mobile communication systems. Specifically, the invention relates to a method and system for providing an Artificial Intelligence (AI)-based object-aware fast data transmission and prediction framework to enable Tactile Internet communication for different types of applications such as, but not limited to, kinesthetic communication, self-driving, remote surgery, online gaming, and financial transactions, by making use of cellular (for example, LTE, 5G, 6G) and wireless (for example, Wi-Fi) network aggregation.

BACKGROUND OF THE INVENTION

With the development of 5G communication systems, tremendous efforts have been made to leverage the potential of this technology in different types of applications that require extremely low latency communication by offering services such as, but not limited to, Enhanced Mobile Broadband (eMBB), Ultra-Reliable Low Latency Communications (URLLC), and Massive Machine Type Communications (mMTC). Applications such as, but not limited to, haptic technology, also known as kinesthetic communication, self-driving, remote surgery, online gaming, financial transactions, wireless Augmented Reality (AR)/Virtual Reality (VR), autonomous, intelligent and cooperative mobility systems, and many more applications require minimal amount of latency to provide users/devices with the highest Quality-of-Service (QoS). This near-perfect end-to-end communication manner is building the very understanding of the Tactile Internet of future, which requires around, say, one millisecond (ms) latency capability.

6G (sixth-generation wireless) will be the successor to 5G cellular technology, which has the capability to use higher frequencies than 5G networks and provide substantially higher capacity and much lower latency. One of the goals of the 6G Internet will be to support 1 microsecond (μs) latency communications, representing 1000 times faster or ¹⁄₁₀₀₀th the latency than 1 ms throughput. 6G is being developed in response to the increasingly distributed Radio Access Network (RAN) and the desire to take advantage of the Terahertz (THz) spectrum to increase capacity and lower latency.

Future wireless Wi-Fi and 5G systems being developed, focus on seamlessly integrating existing wireless technologies. It is envisioned that the offered services will be independent of the underlying network and will be able to support heterogeneous terminals. Also, radio resource management is a key feature of cellular networks. Radio resource allocation, which is a key component of radio resource management, has a direct impact on parameters such as, but not limited to, throughput, latency, reliability, QoS, and the performance of higher layers. With the introduction of haptic communications into cellular networks, radio resource allocation becomes particularly challenging as available resources are shared between haptic applications and other human-to-human (H2H) or machine type communication (MTC) applications, having different and often conflicting service requirements.

Furthermore, due to stringent latency requirements, radio resources must be provided on priority for haptic communications. To provide high tracking performance between master and slave domains, joint resource allocation in the uplink (UL) and the downlink (DL) is necessary. Besides, haptic communications require symmetric resource allocation with minimum constant rate guaranteed in the UL and the DL owing to its bidirectional nature. Therefore, improved and adaptable resource allocation approaches are required to cater to the requirements of haptic communications. Besides, for the co-existence of haptic and other vertical applications, flexible approaches to radio resource management, capable of providing on-demand functionality, are required in future networks.

Tunable Orthogonal Frequency-Division Multiplexing (OFDM) and coordinated OFDM are two different concepts proposed in the literature for wireless communication. The key benefit of tunable OFDM is its adaptability for meeting different requirements. To reduce air-interface latency, both the control and the data planes need to be optimized. With reference to the control plane, an important issue on the air-interface to be considered is radio link failures, which may occur due to several factors and frequently result in loss of Radio Resource Control (RRC) connection.

Additionally, in an effort to develop better utilization and ensure that there is enough available spectrum to support the explosive growth of wireless data, the Federal Communications Commission (FCC) has paved the way for the dynamic nationwide sharing of spectrum—starting with the Citizens Broadband Radio Service (CBRS), 150 MHz of spectrum in the 3.5 GHz band (ranging from 3550-3700 MHz). This is a recognition of the fact that in the past few years, spectrum management technology has advanced to the extent that spectrum can be dynamically shared to securely meet both public and private needs. Therefore, exploitation of such developments is possible only with implementation of new and improved network architectures and components.

Latency is important for many distributed applications. Hence, next generation wireless communications emphasize zero latency. Particularly, in today's multi-player online games, players seek to cluster themselves so that those in the same session have low latency relative to each other. Latencies between machine pairs allow to match clusters to consider many more machine pairs than can be probed in a scalable fashion while users are waiting.

Latency is also important in control signaling and in multimedia. Delivering sound from multiple sources (microphones) to multiple speakers, where each speaker produces a specific set of sounds is also important. In automotive applications, latency plays a significant role on vehicle control, especially in self-driving vehicles. For instance, a 360° camera view can be transferred to another vehicle with time-sensitive frames from multiple cameras. For industrial applications, multiple actuators based on data acquired from multiple sensors must be delivered as and when needed.

To treat this systematically, different levels of QoS in data networks are being researched. There are traditional examples such as Internet Engineering Task Force (IETF) standards for Integrated Services (IntServ) and Differentiated Services (DiffServ). To provide a clear taxonomy on applications that may benefit from networks that offer a menu of different levels of QoS, applications can be categorized into classes such as, but not limited to, "Real Time" and "Non-Real Time", or by tasks such as, but not limited to, "Multimedia Collaboration" or "Video-on-Demand", which may be considered for leveraging multiple networks.

The multi-player networked games, a key application of haptic communications, is an example of a real-time QoS sensitive application. They are perhaps one of the most interesting examples, because unlike other real-time applications such as multimedia conferencing, games have already become popular among Internet users. They are responsible for an increasingly large amount of network traffic while requiring minimum latency on certain packets. Notwithstanding this, several users require scalability to play fast-paced real-time networked games.

The Tactile Internet requires a round-trip latency of 1 ms, which is a humongous task, and itself must address several challenges, in order to materialize. Tactile Internet is an important tier of future networks to characterize performance criteria of communication. According to Next Generation Mobile Networks (NGMN), Tactile Internet is described as "the capability for people to wirelessly control both real and virtual objects, thus requiring tactile-based control signal and feedback of images and sounds." From the Physical Layer perspective, each packet must not exceed a duration of 33 µs to enable a one-way Physical Layer transmission of 100 µs. However, the modulation used in cellular networks is not viable to achieve this requirement, as each OFDM symbol is approximately 70 µs long. A shorter Transmission Time Interval (TTI) is also desirable to reduce over-the-air latency. However, shorter TTI requires higher available bandwidth. Therefore, the Physical layer in 5G must be designed to cater to such critical requirements. Each contributing factor in the end-to-end latency must be optimized to achieve the target latency requirements of the Tactile Internet. The air-interface latency is dominated by the fixed control-plane and user-plane latencies. To reduce these latencies, the optimizations at different layers of the protocol stack below Internet Protocol (IP) layer are required.

Furthermore, the backhaul and core network latency is primarily operator dependent, that is, it is dependent on the choice of the transport network. On the other hand, core Internet latency is variable and largely dictated by queuing delays and routing policies. Thus, innovations in the air interface, protocol stack, hardware, backhaul, core Internet, as well as in the overall network architecture are needed to meet this challenge. Whilst the advances on hardware, protocols, and architecture are important in diminishing end-to-end delays, the ultimate limit is set by the finite speed of light, which sets an upper bound on the maximum separation between the tactile ends. To address these issues, a separate network, specifically designed for haptic communications, is needed. However, this is not feasible considering capital expenditures (CAPEX) as well as operational expenditures (OPEX).

Also, the industry has a general consensus that 5G networks must be designed in a flexible manner such that one network, based on a common physical infrastructure, is efficiently shared among different vertical applications such as, but not limited to, haptic, smart grid, machine-to-machine (M2M), and vehicular to-vehicular (V2V), to meet the diverse requirements of different applications. Such sharing will be possible through greater degree of abstraction of next generation networks, wherein different network slices are allocated to different vertical application sectors. A network slice is defined as a connectivity service based on various customizable software-defined functions that govern a geographical coverage area, availability, robustness, capacity, and security. As an example, Wi-Fi and CBRS networks, along with other network pairs/combinations, can be used together as a multi-interface networking/slicing solution. Considering network slices will move to the edge of the network, slicing-aware applications will be of great importance in near feature.

For the cellular networks, lower latency with 5G is achieved through significant advances in mobile device technology and mobile network architecture. In this context, significant changes in both the core network and RAN are required to deliver low latency. With a re-designed core network, signaling and distributed servers, a key feature is to move the content closer to the end user and to shorten the path between devices for critical applications. To achieve the low latency, the RAN will need to be re-configured in a manner that is highly flexible and include software configurable to support the very different characteristics of the types of services that 5G systems envisage. Low latency and high reliability over the air interface requires new radio techniques to minimize the time delays through the radio within a few TTIs, along with robustness and coding improvements to achieve high degrees of reliability.

Thus, there exists a need for a method and system that provides an improved architecture and a generalized framework for realizing aforesaid applications and addressing the drawbacks of erstwhile communication frameworks in the 5G and the Beyond 5G era.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 7 illustrates a packet structure/format of the system in accordance with an embodiment of the invention.

Figure 1:
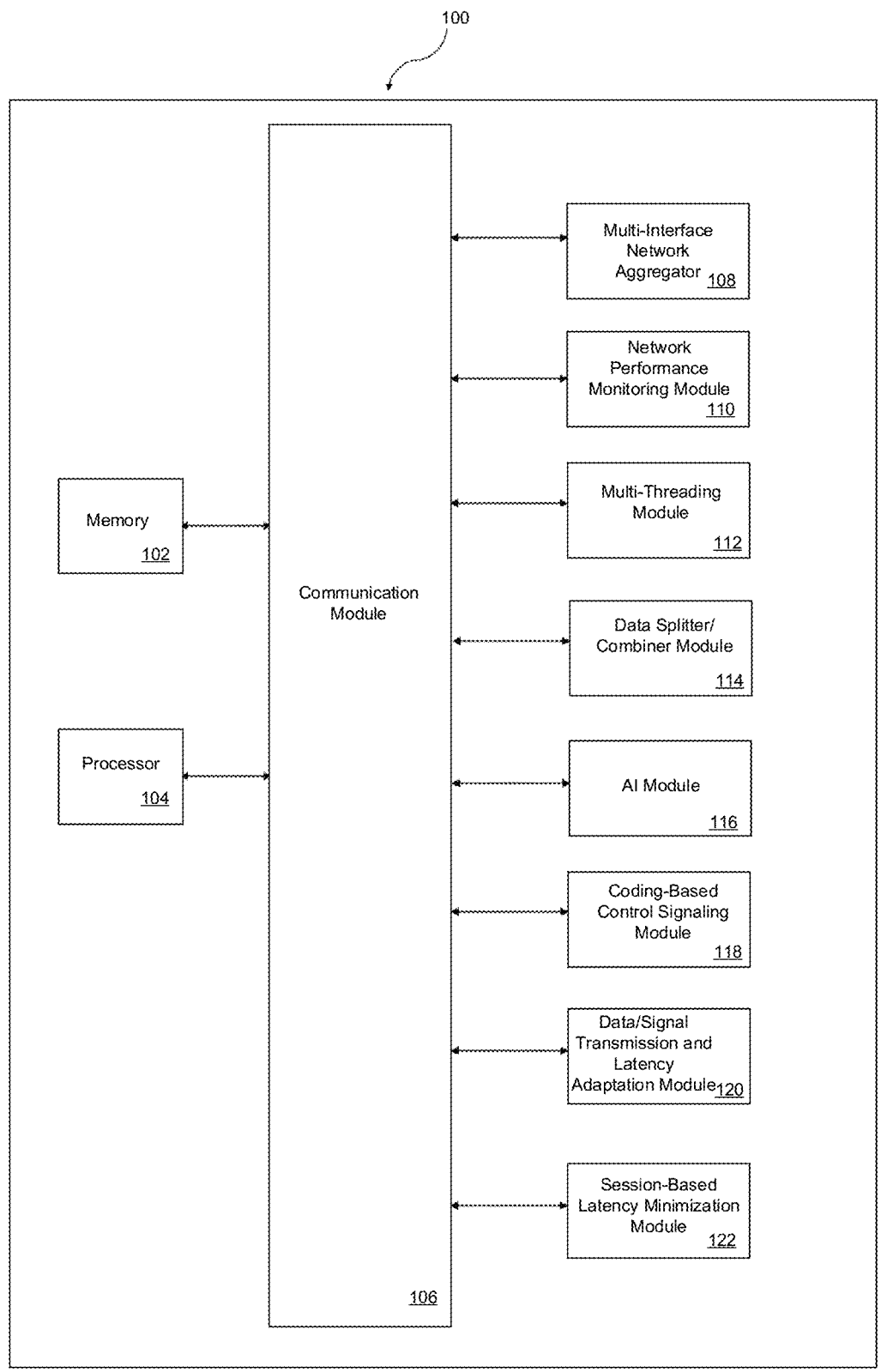
FIG. 1 illustrates a system for enabling low-latency data communication by aggregating a plurality of network interfaces in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the invention, it should be observed that the embodiments reside primarily in combinations of method steps and system components for providing an Artificial Intelligence (AI)-based object-aware fast data transmission and prediction framework to enable Tactile Internet communication for different types of applications such as, but not limited to, kinesthetic communication, self-driving, remote surgery, online gaming, and financial transactions, by making use of cellular (for example, LTE, 5G, 6G) and wireless (for example, Wi-Fi) network aggregation.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Various embodiments of the invention disclose a method and system for enabling low-latency data communication by aggregating a plurality of network interfaces and using an Artificial Intelligence (AI)-based object-aware fast data transmission and prediction framework to enable Tactile Internet communication. Each network interface of the plurality of network interfaces is associated with a different network, such as, but not limited to, a Terrestrial Trunked Radio (TETRA) network, a wireless network (Wi-Fi network), a cellular network (LTE, 5G, 6G), a Citizens Broadband Radio Service (CBRS) network and a public safety network. To start with, the method and system measures in real-time, network performance capabilities associated with the networks via the respective network interfaces. Each network of the plurality of networks is associated with different Quality-Of-Service (QoS) profiles/characteristics based on QoS metrics such as, but not limited to, packet latency, bandwidth, throughput, jitter, and packet loss rate. The method and system then assigns two or more multi-threading processors in a multi-processor architecture configured to execute a plurality of threads for processing one or more data streams. A multi-interface network aggregation-based data splitter/combiner decomposes the one or more data streams over the two or more multi-threading processors, by threading a single function to operate on two or more data blocks corresponding to the one or more data streams at the same time. The multi-interface network aggregation-based data splitter/combiner can be, but need not be limited to, (i) an Application Programming Interface (API)/application coded on the user-equipment (UE), (ii) an access terminal splitter/combiner, (iii) a core network splitter/combiner, or (iv) a combination thereof. Furthermore, the multi-interface network aggregation-based data splitter/combiner utilizes a convolutional coding mechanism which introduces control signaling with previous and current control signaling for data prediction and correction, wherein a soft decision mechanism at a receiving end considers the possible sequential patterns of a human being to decode errors or missing control information. The threading in each processor is interlinked with two or more network interfaces based on the measured network performance capabilities and network performance capability requirements of the one or more data streams, thereby enabling threading-based cooperation among multi-core processors in the multi-processor architecture and the plurality of network interfaces. The threading-based cooperation among multi-core processors in the multi-processor architecture and the plurality of network interfaces is performed via the multi-interface network aggregation using AI. In case data streams are destined to a single user over a single server, an API/application coded on the UE handles the threading-based data transmissions/receptions via the multi-interface network aggregation. Otherwise, the procedure is performed by either an access terminal splitter/combiner, a core network splitter/combiner, or both. The one or more data streams are then transmitted to the two or more network interfaces and thereon to the associated networks for transport.

In an embodiment of the invention, the convolutional coding mechanism predicts lost or delayed data at the receiving end. The prediction operation is performed at a sending end as on the receiving end, thereby ensuring continuity of communication within very low (near-zero) latency. The prediction operation further includes continuously analyzing whether the predicted data at the sending end is the same as the actual data while the data is already being created at the sending end. In the event the actual data being produced at the sending end and the predicted data at the sending end are the same, a signal with a minimum number of bits is transmitted to the receiving end, indicating that the prediction is successful instead of transmitting the actual data over the network. In the event the actual data being produced at the sending end and the predicted data at the sending end are not the same, a preliminary signal is transmitted to the receiving end indicating the event, before the actual data is transmitted over the network, wherein upon receiving the preliminary signal, the receiving end updates its prediction according to the information in the signal, and dynamically adjusts timeout (latency adaptation time) required for the acquisition of real data.

In another embodiment of the invention, a multi-interface network aggregation-based slicing of the plurality of network interfaces to a plurality of slides is provided. Applications are allowed to use two or more slides of the plurality of slides at once for different parts of the transmission based on linking QoS requirements of the different parts of the transmission and QoS profiles/characteristics of each slide of the plurality of slides. The multi-interface network aggregation-based slicing is enabled using Network Function Virtualization (NFV) and Software Defined Networking (SDN). The NFV provides the separation of network functions from hardware infrastructure and the SDN provides an architectural framework, wherein control and data planes of the SDN are decoupled, and direct programmability of network control is enabled through software-based controllers.

FIG. 1 illustrates a system 100 for enabling low-latency data communication by aggregating a plurality of network interfaces in accordance with an embodiment of the invention.

System 100, which consists of several modules, can be launched as a mobile application on any computing device, such as, but not limited to, a smart phone, a tablet, or a mobile device. Specifically, system 100 disclosed herein meets the requirements that existing applications need for Tactile Internet communication and leads to the implementation of new applications in various fields that require Tactile Internet capability.

As illustrated in FIG. 1, system 100 comprises a memory 102 and a processor 104 communicatively coupled to memory 102. Memory 102 and processor 104 further communicate with various modules of system 100 via a communication module 106.

Communication module 106 may be configured to transmit data between modules, engines, databases, memories, and other components of system 100 for use in performing the functions discussed herein. Communication module 106 may include one or more communication types and utilizes various communication methods for communication within system 100.

System 100 includes a multi-interface network aggregator 108 for aggregating a plurality of network interfaces. Each network interface of the plurality of network interfaces is associated with a different network selected from a group of networks consisting of, but not limited to, the following: a Terrestrial Trunked Radio (TETRA) network, a wireless network (Wi-Fi network), a cellular network (LTE, 5G, 6G), a Citizens Broadband Radio Service (CBRS) network and a public safety network.

System 100 further includes a network performance monitoring module 110 for measuring in real-time, network performance capabilities associated with the networks via the respective network interfaces. Each network of the plurality of networks is associated with different Quality-Of-Service (QoS) profiles/characteristics based on QoS metrics such as, but not limited to, packet latency, bandwidth, throughput, jitter, and packet loss rate.

System 100 further includes a multi-threading module 112 which assigns two or more multi-threading processors in a multi-processor architecture configured to execute a plurality of threads for processing one or more data streams.

A data splitter/combiner module 114 of system 100 enables a multi-interface network aggregation-based data splitter/combiner to decompose the one or more data streams over the two or more multi-threading processors, by threading a single function to operate on two or more data blocks corresponding to the one or more data streams at the same time. The multi-interface network aggregation-based data splitter/combiner can be, but need not be limited to, (i) an Application Programming Interface (API)/application coded on the user-equipment (UE), (ii) an access terminal splitter/combiner, (iii) a core network splitter/combiner, or (iv) a combination thereof.

The threading in each processor is interlinked with two or more network interfaces based on the measured network performance capabilities and network performance capability requirements of the one or more data streams, thereby enabling threading-based cooperation among multi-core processors in the multi-processor architecture and the plurality of network interfaces. Each multi-threading processor comprises one or more functional blocks running a block of code which accesses one or more data blocks, wherein functional blocks are matched with two or more network interfaces based on data dependencies, processor usage and network performance capability requirements. The functional blocks that access same data blocks execute on the same thread and are interlinked with a same set of network interfaces.

The threading-based cooperation among multi-core processors in the multi-processor architecture and the plurality of network interfaces is performed via the multi-interface network aggregation using an AI module 116. In case data streams are destined to a single user over a single server, an API/application coded on the UE handles the threading-based data transmissions/receptions via the multi-interface network aggregation. Otherwise, the procedure is performed by either an access terminal splitter/combiner, a core network splitter/combiner, or both. The one or more data streams are then transmitted to the two or more network interfaces and thereon to the associated networks for transport.

System 100 further includes a coding-based control signaling module 118 which implements a convolutional coding scheme for control signaling in haptic-based Tactile Internet. This coding scheme introduces correction in case latency occurs in the communication system. Hence, zero latency performance is achieved without zero latency communication for certain Tactile Internet communication.

In accordance with an embodiment, the convolutional coding mechanism in the multi-interface network aggregation-based data splitter/combiner, introduces control signaling with previous and current control signaling for data prediction and correction. A soft decision mechanism at a receiving end considers the possible sequential patterns of a human being to decode errors or missing control information. Further, the convolutional coding mechanism provides for correcting memory 102, and the receiving end matches corrected information in memory 102 with the possible movement patterns or cycle of movement patterns of a human body.

In accordance with another embodiment, the method used in coding-based control signaling module 118 only considers Tactile Internet for shadow like robots with haptic devices, where the only communication required is transfer of control signaling not multimedia. Also, these robots do not follow pure random movements but the movements of a normal human being. Hence, the movements are continuous, correlated, kinesthetic and tactile sequential events. In this regard, coding-based control signaling module 118 introduces a coding mechanism over multiple interfaces for control signaling of Tactile Internet for remote shadow and haptic robots that replicate a human in a remote location. This methodology achieves zero latency performance without a zero-latency communication system. Further, the coding mechanism embedded in the communication corrects missing or late arrived signaling.

A remote robot may be a shadow/follower which performs whatever a human does or follows a human wherever he goes, effectively understands, and imitates body languages and the like. For instance, every stroke a person draws on a tablet, the robot reproduces an identical stroke on a canvas situated in a remote location. This perfect duplication of a human's work in a remote and synchronous manner is the very essence of building Tactile Internet for the future.

Figure 2:
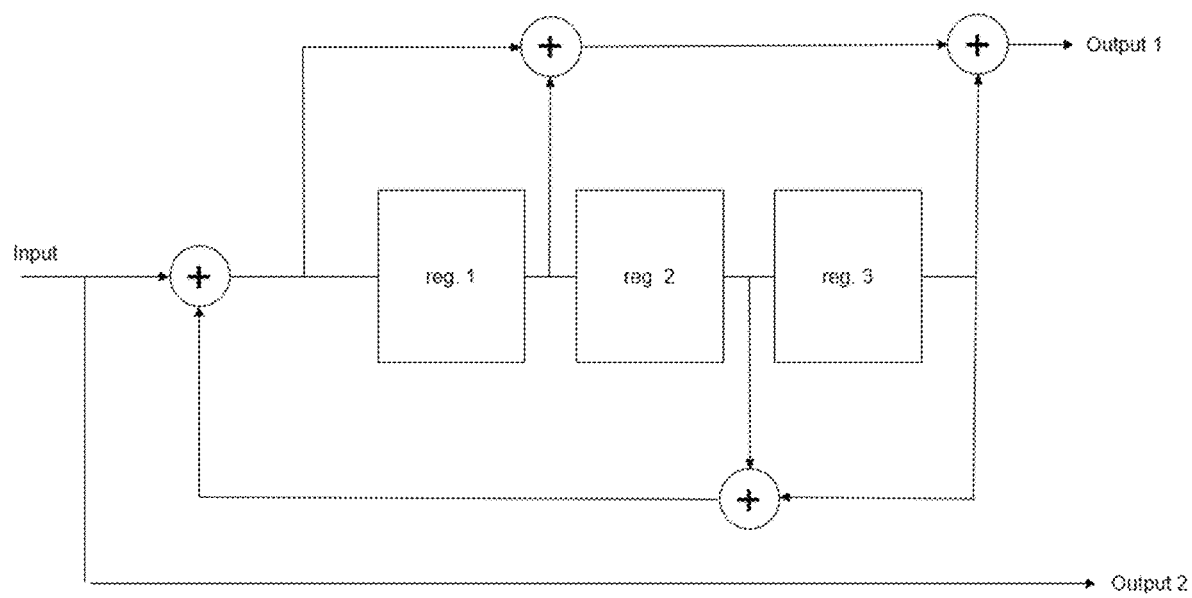
FIG. 2 illustrates an example encoder in accordance with an embodiment of the invention.
Figure 3:
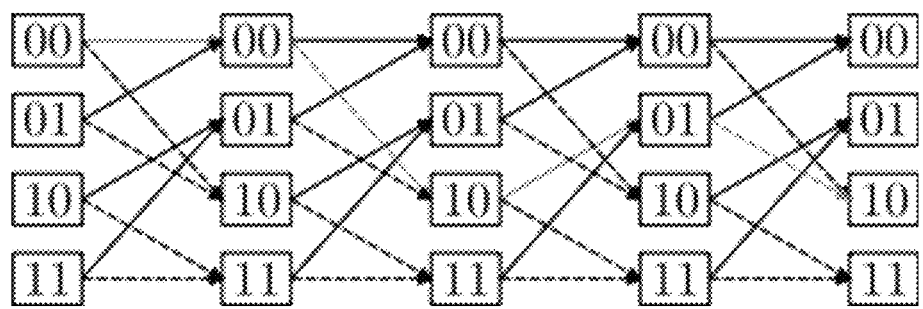
FIG. 3 illustrates a trellis diagram for the encoder in accordance with an embodiment of the invention.
Figure 4:
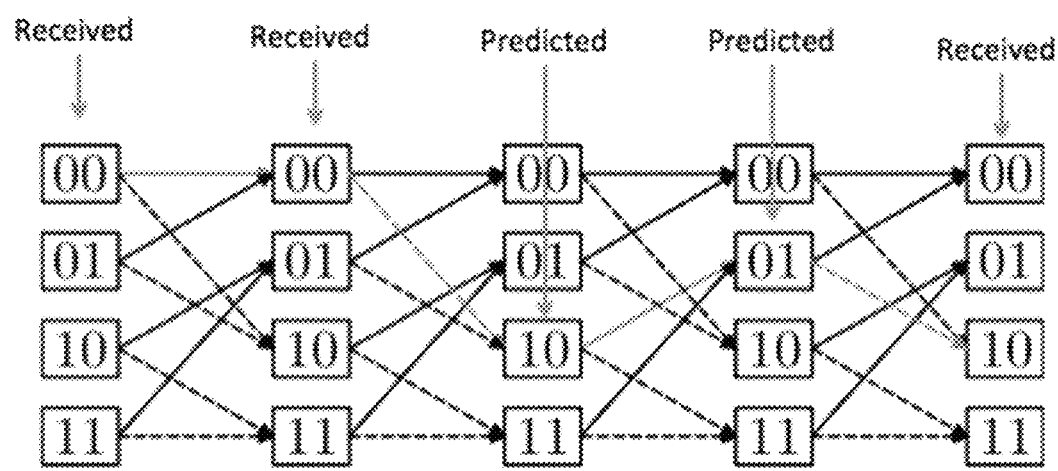
FIG. 4 illustrates a decoding process to predict next information during communication in accordance with an embodiment of the invention.

In accordance with yet another embodiment, coding-based control signaling module 118 utilizes forward error correction (FEC) which is widely used in digital communication. In telecommunication, information theory, and coding theory, FEC or channel coding is a technique used for controlling errors in data transmission over unreliable or noisy communication channels. The core idea of FEC is that a sender encodes a message in a redundant way by using an error-correcting code (ECC). This redundancy allows a receiver to detect a limited number of errors that may occur anywhere in the message, and often to correct these errors without retransmission. Further, FEC provides a receiver the ability to correct errors without needing a reverse channel to request retransmission of data, but at the cost of a fixed, higher forward channel bandwidth. FEC processing in a receiver may be applied to a digital bit stream or in the demodulation of a digitally modulated carrier. A Viterbi decoder implements a soft-decision algorithm to demodulate digital data from an analog signal corrupted by noise. An example encoder with n binary cells is illustrated in FIG. 2 and a trellis diagram for the encoder is illustrated in FIG. 3. The decoding process is illustrated in FIG. 4.

System 100 further includes a data/signal transmission and latency adaptation module 120 which uses the convolutional coding mechanism to predict lost or delayed data at a receiving end. The prediction operation of data/signal transmission and latency adaptation module 120 is performed at a sending end as on the receiving end, thereby ensuring continuity of communication within very low (near-zero) latency. The prediction operation further includes continuously analyzing whether the predicted data at the sending end is the same as the actual data while the data is already being created at the sending end. In the event the actual data being produced at the sending end and the predicted data at the sending end are the same, a signal with a minimum number of bits is transmitted to the receiving end indicating that the prediction is successful instead of transmitting the actual data over the network. In the event the actual data being produced at the sending end and the predicted data at the sending end are not the same, a preliminary signal is transmitted to the receiving end indicating the event, before the actual data is transmitted over the network. Upon receiving the preliminary signal, the receiving end updates its prediction according to the information in the signal, and dynamically adjusts timeout (latency adaptation time) required for the acquisition of real data.

In accordance with an embodiment, using coding-based control signaling module 118, lost or delayed data is produced by prediction on a receiver-side using a prediction algorithm, to ensure the continuity of communication within very low (near-zero) latency. Using data/signal transmission and latency adaptation module 120, the prediction operation is also performed on a sender-side as on the receiver-side using the prediction algorithm. In this way, whether the predicted data is the same as the actual data is continuously analyzed from the very first moment (while the data is already being created on the sender-side), and two different approaches are determined according to the two cases that may occur.

In case the actual data being produced on the sender-side and the predicted data on the sender-side are the same, instead of transmitting the actual data over the network, a signal with a minimum number of bits indicating that the prediction is successful is transmitted to the receiver-side. Since the data to be produced by the prediction algorithm performed on the sender-side is the same as the real data, the prediction algorithm on the receiver-side also produces the same real data. Thus, network traffic is reduced and faster transmission of the signal to the receiver is provided. Upon receiving this signal on the receiver-side, the real data is produced immediately as the prediction process is already performed on the receiver-side. With this method, latency is further reduced, since a smaller size signal than real data is sent from the sender to the receiver earlier than the expected time as whenever the prediction algorithm decides, the prediction process is able to accurately create the real data.

In case the actual data being produced on the sender-side and the predicted data on the sender-side are not the same, before the actual data is transmitted on the network (whenever the prediction algorithm decides the prediction will not be able to accurately create the real data), a preliminary signal is transmitted to the medium indicating this situation. The receiver that receives this signal updates the prediction algorithm according to the information in the signal, as well as dynamically adjusts the timeout (latency adaptation time) required for the acquisition of real data. In the event that the actual data transmitted by the sender does not reach the receiver (in case of lost data or timeout), the prediction algorithm on the receiver-side is performed after the latency adaptation time period that is set dynamically. In this way, it is ensured that the prediction algorithm for the lost/delayed data is more effective than previous methods. In addition, dynamically adjusting the latency adaptation time increases the possibility of real data reaching the receiver. In this way, the frequency of execution of the prediction algorithm to produce data with a high margin of error, is also reduced. Even if there is a delay due to latency adaptation time as a result of these processes, subsequent packets/data are produced quickly on the receiver-side and transmitted to the upper layer. In this way, zero latency status is continued for a long term.

System 100 further includes a session-based latency minimization module 122 which optimizes end-to-end latency to achieve target latency requirements of communication.

Session-based latency minimization module 122 enables multi-interface network aggregation-based slicing of the plurality of network interfaces to a plurality of slides. Applications are allowed to use two or more slides of the plurality of slides at once for different parts of the transmission based on linking QoS requirements of the different parts of the transmission and QoS profiles/characteristics of each slide of the plurality of slides. For instance, to transfer a picture, header is transferred over a low latency slide, password is transferred over another slide and the rest of the data is transferred over a broadband slide. In the case of a gaming application, control information may be transmitted using a slide different than that used to transfer content information. Also, in robotics, spatial and temporal movements may be coded over different multi-interface slides and correction is introduced at the other end for missing or corrupt information.

Such a slicing approach provides more of a network on demand functionality. A network architecture of multi-interface network aggregation-based slicing is realized using two important technologies: Network Function Virtualization (NFV) and Software Defined Networking (SDN). Both technologies provide the tools to design networks with greater degree of abstraction, increasing the network flexibility.

The NFV provides the separation of network functions from the hardware infrastructure. In an embodiment, the network function can be managed as a software module that can be deployed in any standard cloud, edge-cloud, or an Augmented Reality (AR)-cloud infrastructure, which is the digital content layer mapped to objects and locations in the physical world to enable a ubiquitous, scalable, and spatial user experience. The AR-cloud enables all the information and content in the virtual world to directly connect with the physical world and even become a part of the reality. This is only possible by creating a digital copy (Digital Twin) of the real physical world and associating the information added to this digital copy with the relevant physical spaces and objects in the real world.

On the other hand, SDN provides an architectural framework wherein control and data planes are decoupled and direct programmability of network control through software-based controllers is enabled. Although SDN is viewed as a tool for next generation core network, it can be extended to the radio access part in the form of Self-Organizing Networking (SON) solutions.

Session-based latency minimization module 122 further utilizes coordinated Orthogonal Frequency-Division Multiple Access (OFDMA) in which collaborative Access Points (APs) synchronize their data transmissions and use orthogonal time/frequency resources. This coordinated resource assignment diminishes the collision probability when APs implement independent contention-based channel access procedures. Coordinated OFDMA is particularly attractive to minimize the latency of short packet data transmissions, since it allows efficient sharing and full occupation of the frequency band by collaborating neighboring devices.

In accordance with an embodiment, to ensure stability of a haptic system, Evolved Node B (eNodeB) supports a fast Radio Resource Control (RRC) connection re-establishment feature. This is achieved by optimizing the random-access procedure, for example, enabling contention free access with some dedicated resources, and by optimizing the RRC connection re-establishment phase by reducing the number of control messages exchanged with the eNodeB. Alternatively, for haptic sessions, the RRC state is made transparent to radio link failures and enable devices to stay in the connected mode after initial session establishment.

In the user-plane, Hybrid Automatic Repeat Request (HARQ) is used to provide link-level reliability. However, HARQ is not suitable for haptic communications owing to its increased retransmission delay. By disabling HARQ for haptic communications, for reduced air-interface latency, link-level reliability is provided through other techniques. One way of reducing the backhaul delay is to adopt optical transport as the backhaul medium. An attractive alternative to deploying optical fiber is a full-duplex wireless backhaul, especially in higher spectrum bands. Due to the distinct characteristics of full-duplex communications, full-duplex wireless backhaul can be realized in two distinct ways: (a) bidirectional link between the eNodeB and the core network, and (b) two unidirectional links; one from the user to the eNodeB and the other from the eNodeB to the core network. Finally, the processing delay in different nodes of the networks is reduced by increasing the computational power of different nodes/entities.

Additionally, in current/future wireless network standards such as 802.11ax and 802.11be which provide 30% faster speeds, latency is cut by 75% compared to the 802.11ac, by making use of sub-channels allocation into resource units (RUs) that may be used to talk simultaneously with multiple 802.11ax clients, for instance, up to nine on one 20 MHz channel, or 74 on a 160 MHz channel group. This means much lower latency and fairer distribution of bandwidth between 802.11ax clients is achieved. Furthermore, multi-band/multi-channel aggregation and operation feature of the 802.11be, leads to a more efficient use of these multiple bands and channels, with the use of dual-radio stations and tri-band APs capable of simultaneously operating at 2.4, 5 and 6 GHz. Moreover, simultaneous transmission and reception in different bands/channels in 802.11be has the potential of reducing the communication latency and enhancing the throughput by enabling an asynchronous and simultaneous uplink/downlink operation in separate bands/channels. In addition, Wi-Fi 6 is employed for spatial reuse. Basic Service Set (BSS) coloring allows Wi-Fi 6 stations to quickly identify whether the channel is occupied by a device of the same BSS (same color, intra-BSS packet) or one from another BSS (different color, inter-BSS packet).

FIG. 2 illustrates a rate 1/2 8-state recursive systematic convolutional encoder, used as constituent code in 3GPP 25.212 Turbo Code. The convolutional encoder is a finite state machine and has 2n states.

As illustrated in FIG. 2, the encoder has '1' in the left memory cell (m0), and '0' in the right one (m1). m1 is not really a memory cell because it represents a current value. Such a state is designated as "10". According to an input bit, the encoder at the next turn can convert either to the "01" state or the "11" state. Also, not all transitions are possible. For example, a decoder cannot convert from "10" state to "00" or even stay in "10" state. All possible transitions are illustrated in FIG. 3.

Referring to FIG. 3, a path through the trellis is shown as a red line. The solid lines indicate transitions where a "0" is input and the dashed lines indicate transitions where a "1" is input. An actual encoded sequence can be represented as a path on this graph. One valid path is shown in red as an example. If a received sequence does not fit this graph, then it was received with errors, and the nearest correct (fitting the graph) sequence must be chosen. This concept is exploited in real decoding algorithms.

In collaborative multi-user haptic communications, multiple networks interact in a shared remote environment. From a networking perspective, this method will inevitably require the formation of an overlay to orchestrate the participation of multiple networks in addition to the facilitation of several other necessary functions. Haptic devices mostly provide single-point end effectors, that is, single contact point for kinesthetic and tactile feedback.

In this model, data splitter/combiner module 114 in an access terminal acts as an intermediate connector between processors and access interfaces. Data splitter/combiner module 114 also implements the functions inside the coding method.

For instance, requests are conveyed with messages from the blocks to an access terminal combiner/splitter and from the access terminal combiner/splitter to the access interfaces. A message contains a payload, QoS requirement and destination(s). QoS requirements may be enriched in several ways. Traditionally, QoS requirements are classified as follows: Soft Real Time, Rate Based, Resource Based, Deadline Based, Hard Real Time, and Best Effort.

In an embodiment, in the case of haptic communications, information about a robot such as, but not limited to, type of robotic activity, and information about the environment, are also required. This information is coded into the packet for the access terminal combiner/splitter to decide the interface. The access terminal combiner/splitter performs the coding operation with respect to the information from the access interfaces to perform the multi networking requirement of a network slice. Hence, slicing is expanded over multiple interfaces. The control information is first passed to a convolutional encoder and is bit wise concatenated to multiple interfaces. The control information is then sent to the access terminal combiner/splitter multi-interface, and to a core network combiner/splitter in the network which performs the Viterbi decoding. In an instance, Wi-Fi and CBRS networks are used as a multi-interface solution. Any missing information is interpreted from previous information. Also, Viterbi decoding predicts the next information so that latency is considerably reduced as illustrated in FIG. 4.

Instability in haptic control occurs primarily due the two key wireless channel impairment: latency and packet loss, wherein latency has a higher detrimental effect on stability of the communication system compared to packet loss.

The method employed reduces the impact of latency on haptic control by deploying predictive and interpolative/extrapolative modules. Such tactile support engines enable statistically similar actions to be taken autonomously whilst the actual action is on its way by transmission via the network. For this purpose, different types of machine learning techniques are adopted. For instance, in FIG. 4, the red line is learned via machine learning. This approach not only brings stability to Tactile Internet but also helps in overcoming the fundamental limitation set by the finite speed of light, by allowing a wider geographic separation between the tactile ends.

Figure 5:
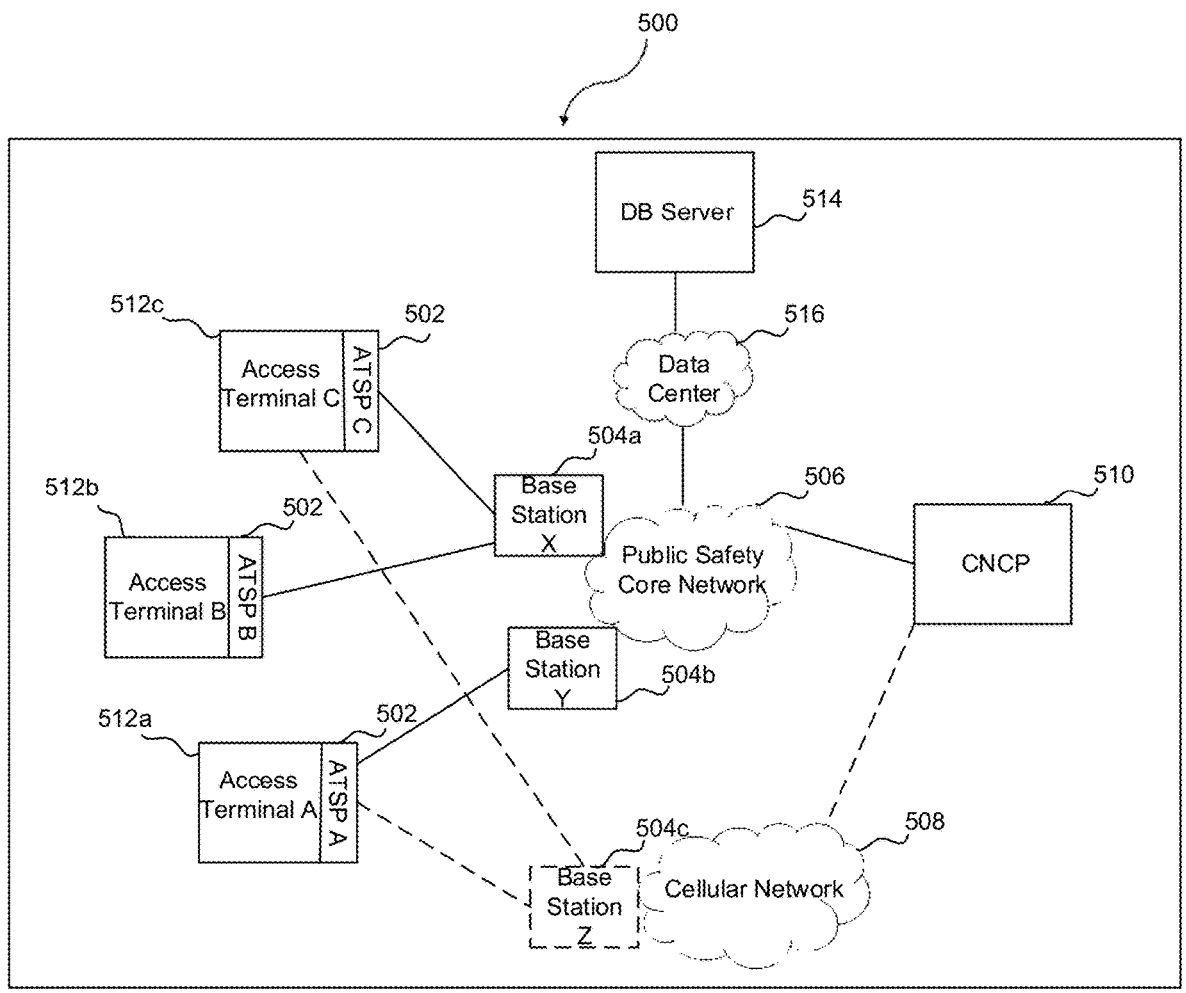
FIG. 5 illustrates a network architecture comprising network components for realization of the system for enabling low-latency data communication through multi-interface network aggregation in accordance with an embodiment of the invention.

FIG. 5 illustrates a network architecture 500 comprising network components for realization of system 100 for enabling low-latency data communication through multi-interface network aggregation in accordance with an embodiment of the invention.

As illustrated in FIG. 5, network architecture 500 comprises an Access Terminal Combiner and Splitter (ATSP) 502, a plurality of base stations, Base Station X (504a), Base Station Y (504b), and Base Station Z (504c), in both a Public Safety Core Network 506 (for example, Wi-Fi, TETRA) and a cellular network 508 (for example, LTE, 5G, 6G), and a Core Network Combiner and Splitter (CNCP) 510.

ATSP 502 resides in an access terminal network stack and CNCP 510 is a gateway located somewhere in the north of Public Safety Core Network 506. Both ATSP 502 and CNCP 510 have a combiner and splitter mechanism. CNCP 510 also includes a routing functionality, and performs high-level combining if sessions are from the base stations (uplink) or splitting if sessions are towards base stations (downlink). Base stations are entities that have wired and wireless interfaces and talk to terminals through their wireless interfaces. Each base station has a fixed amount of resource per frame and is required to distribute this resource to its terminals. To accomplish this, there is provided a method for ATSP 502 and CNCP 510 to treat data sessions in mobile stations (access terminals).

To further clarify the division of splitting/combining tasks between ATSP 502 and CNCP 510, FIG. 5 further illustrates a high-level example network diagram with an Access Terminal A (512a), an Access Terminal B (512b) and an Access Terminal C (512c), and a database (DB) server 514, all attached to Public Safety Core Network 506. These access terminals can be, but need not be limited to, wireless laptops, wireless telephones, and wireless sensors. Referring to FIG. 5, Access Terminals B and C are attached to Base Station X, Access Terminal A is attached to Base Station Y, and DB Server 514 is attached to Public Safety Core Network 506. DB server 514 is possibly a repository of all images and videos taken by access terminals and located in a secure Data Center 516 attached to Public Safety Core Network 506. In a hybrid networking configuration, Access Terminals A and B are also attached to cellular (wireless) network 508 via cellular Base Station Z, and therefore have ATSP 502 functions for content splitting/combining at the access terminal. CNCP 510 is attached to Public Safety Core Network 506 and core cellular network 508.

In accordance with an embodiment, network architecture 500 further increases the granularity to use two networks for a same session. If an access terminal or server is only attached to Public Safety Core Network 506, the splitting function is performed by the nearest CNCP within the core network. If an access terminal or server is attached to both Cellular Network 508 and Public Safety Core Network 506, the splitting function is performed by ASTP 502 on the access side. The splitting and combining functions are therefore performed by ATSP 502 or CNCP 510 depending on the capabilities of the access terminal originating or terminating content as illustrated for various originating (from)-terminating (to) scenarios that correspond to the network configuration of FIG. 5 as illustrated in the following table.

TABLE

| From | To | Splitting Function | Combining Function |
| --- | --- | --- | --- |
| Access Terminal A | Access Terminal B | ATSP A | ATSP B |
| Access Terminal A | Access Terminal C | ATSP A | CNCP |
| Access Terminal A | DB Server 514 | ATSP A | CNCP |
| Access Terminal C | Access Terminal A | CNCP 510 | ATSP A |
| DB Server 514 | Access Terminal C | — | — |

Figure 6:
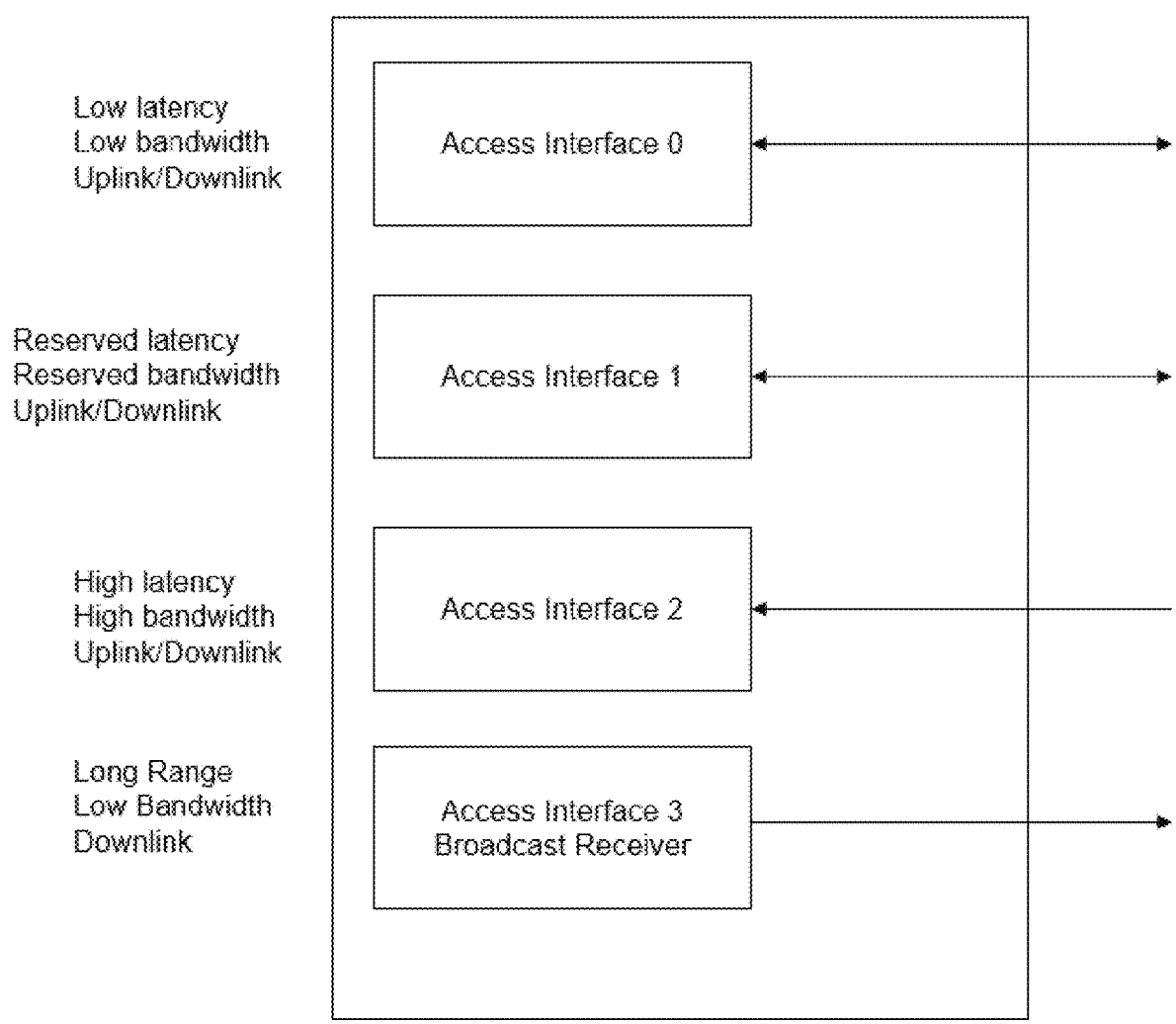
FIG. 6 illustrates network interfaces of the system in accordance with an embodiment of the invention.

FIG. 6 illustrates an architecture of multiple access interfaces of system 100 in accordance with an embodiment of the invention.

FIG. 7 illustrates a packet format/structure of system 100 in accordance with an embodiment of the invention.

As illustrated in FIG. 6 and FIG. 7, the network access interfaces have very different quality characteristics. Typically, today's clients have bidirectional communication interfaces. Also, there may be broadcast interfaces where only downlink information is received. This could be in the lower frequencies to reach mass numbers at once in the downlink. As illustrated in FIG. 6 and FIG. 7, multiple interfaces require monitoring and availability, wherein coverage could be intermittent. If coverage is available, performance of ATSP 502 may be more deterministic. Otherwise, ATSP 502 performs learning and decision functionalities to select a best network access interface to service a request.

In accordance with an exemplary embodiment of the invention, system 100 is described in context of a gaming application, wherein a multi-threading gaming module is employed.

The multi-threading gaming module introduces a novel game design based on multi-core processors and multi-access wireless interfaces for multi-player games. A novel game development method over multiple processors and multiple access interfaces is further provided. This method introduces a novel mechanism to avoid many potential hurdles in multi-player network games by introducing multiple wireless interfaces for a multi-processor architecture. Functional and data blocks placed in different processors are interlinked with multiple wireless interfaces with respect to the QoS levels they require and a method to enable this streaming mechanism is implemented. As the number of processors and number of access interfaces increase, game design benefits the method.

The multi-threading gaming module of system 100 provides a mechanism to provide low latency for networked gaming as well as a gaming architecture with multiple processors. The multi-threading gaming module considers multiple processors and multiple wireless networks with different QoS characteristics; 5G is a fifth-generation cellular network technology defined by standards issued by the 3GPP. 5G networks can also utilize other non-3GPP or 3GPP networks to adjust rapid changes in demand distribution and other variable factors. The usage of different networks is a necessity and part of the 5G heterogeneous networks. System 100 is also applicable to Wi-Fi networks with IEEE 802.11 protocols and other versions. The parameters taken into consideration can be, but need not be limited to, the following: throughput—the minimum data rate, transit delay—the elapsed time between a data message being emitted from a sender and consumed by a receiver, delay variation (jitter)—the maximum variation allowed in delay, error rate—the ratio of incorrectly-received or lost data to transmitted data, and degree of reliability—the minimum number of members of a group that must receive each item of data.

System 100 further increases the object awareness in delay over multiple sessions. Game engines of system 100 for performance reasons consider several threaded and parallel processing. Therefore, dual processors leveraged for gaming applications are different than the ones used in traditional applications. This provides an impressive increase in speed as required by the games. Such games, due to their complex data structures and functional interdependence, must be tackled differently from the beginning. The architecture of system 100 handles this through implementation of multiple access interfaces.

In an embodiment, threading in gaming with two and four processors are interlinked with two or more access interfaces with different QoS profiles using the multi-threading gaming module. Threading runs different sections of code simultaneously on different processors. The single-threaded code executes serially throughout its run. The dual-threaded code has two sections that execute concurrently during its run. Parallel processing enables the entire run to take less time to execute. An architecture illustrating the relation between processors and access interfaces is illustrated in FIG. 8.

Figure 8:
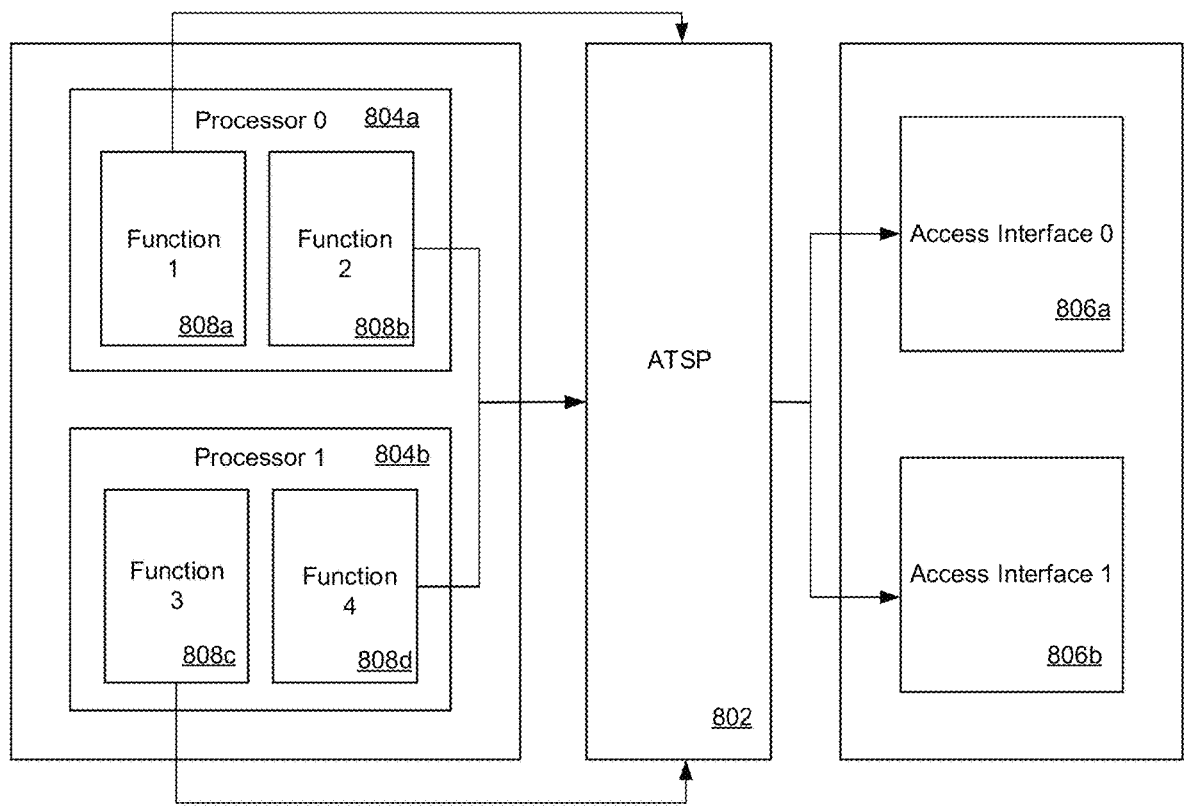
FIG. 8 illustrates an architecture describing the relation between processors and access interfaces in accordance with an embodiment of the invention.

As illustrated in FIG. 8, an ATSP 802 acts as an intermediate connector between processors (804*a*, 804*b*) and access interfaces (806*a*, 806*b*). ATSP 802 also connects functions (808*a*, 808*b*, 808*c*, 808*d*) running inside processors (802*a*, 802*b*) of the gaming application. Hence, a threaded gaming development is enabled over multiple processors and multiple access interfaces with ATSP 802 as mediator.

ATSP 802 also supports data decomposition over multiple processors. Data decomposition comprises threading a single function to operate on two or more blocks of data at the same time. During game design, functional blocks and interconnections between the functional blocks must be listed and this provides the data dependencies and access network requirements. Different blocks of code are matched based on data dependencies and processor usage. A balance is required with respect to a thread that has the block of code and a matching access interface. Similarly, blocks and access interfaces require the proper execution balance to reduce time in making data copies or synchronizing for data access. Thus, functions that access the same data are associated with the same thread and access interface pair.

Each access interface has very different quality characteristics. Typically, today's clients have bidirectional communication interfaces such as 2G, 3G, 4G and 5G systems. Also, in future, there could also be a broadcast interface where only downlink information is received. This could be in the lower frequencies to reach mass numbers at once in downlink. Also, multiple access interfaces require monitoring and availability, and coverage may be intermittent. If coverage is available, ATSP 802's performance may be more deterministic. Otherwise, ATSP 802 performs learning and decision functionalities to select the best interface for the best request. As a result, ATSP 802 is aware of the game content and game controls for best decision making.

Furthermore, requests are conveyed with messages from the blocks to ATSP 802 and from ATSP 802 to the access interfaces. A message contains the payload, QoS requirement and destination(s). QoS requirements may be enriched in several ways. Traditionally, QoS requirements are classified as follows: Soft Real Time, Rate Based, Resource Based, Deadline Based, Hard Real Time, and Best Effort.

For a gaming application, QoS requirements can include, but need not be limited to, the following: background information that has heavy image transmission, control information that has light data rate but zero-latency requirement, movement information that has zero latency but also heavy image transmission, message to many clients that must be synchronized at the same time, message to a few clients, audio first transmission, wherein the audio part is more important than video and control, video first transmission, wherein the video part is more important than audio and control, control first transmission, wherein the control part is more important than video and audio, intensity of the activity interval which indicates the data/latency characteristics of the interval in which the game player is in.

The QoS requirements are coded into the packet for ATSP 802 to decide an access interface. ATSP 802 performs this decision-making based on the information from the access interfaces, to meet the multi-player networking requirement of the gaming. This is depicted in FIG. 9, where a gaming client and gaming server exchange messages.

Figure 9:
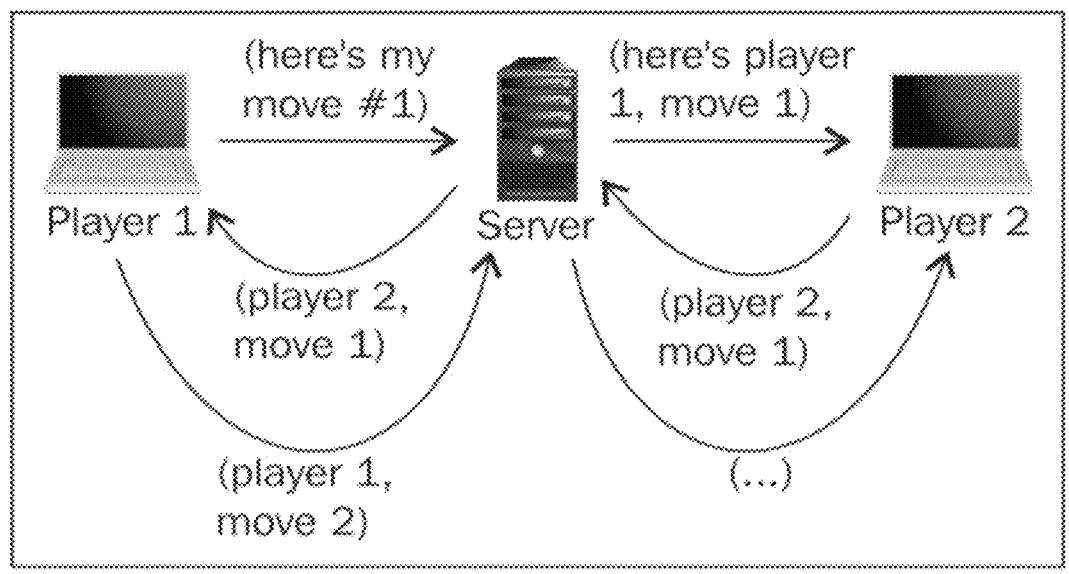
FIG. 9 illustrates sample moves (control signaling) performed over multi-player networking in accordance with an embodiment of the invention.
Figure 10:
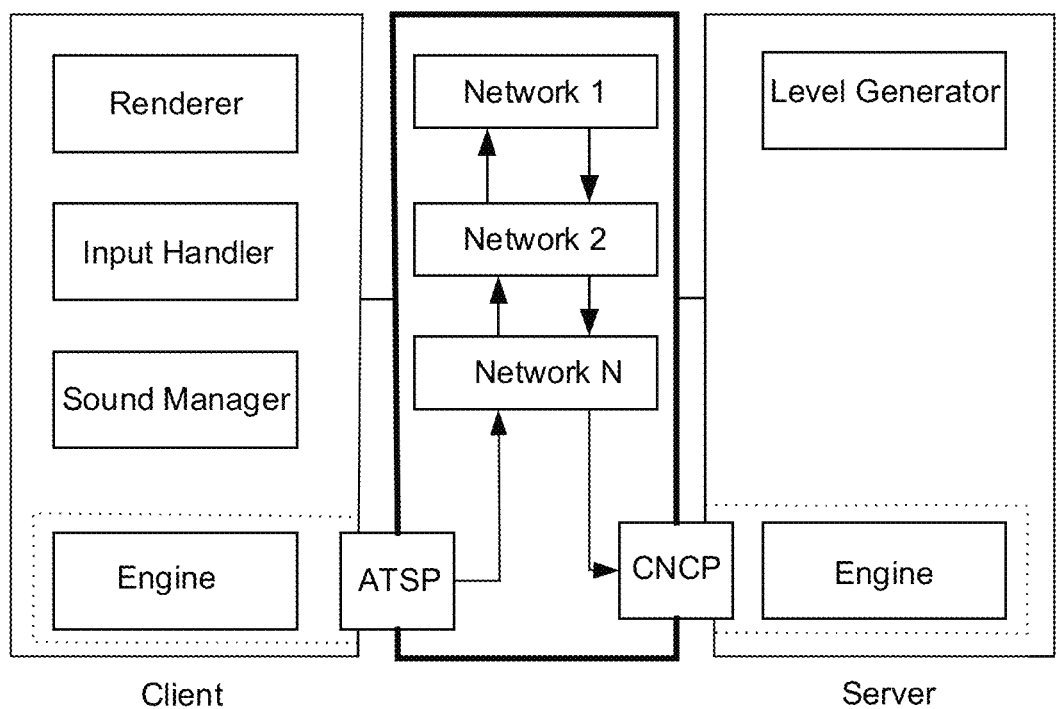
FIG. 10 illustrates an overall gaming architecture with multi-threading in accordance with an embodiment of the invention.

FIG. 9 indicates the control signaling and FIG. 10 indicates the interaction with respect to the method presented herein. As can be seen from the figures, the granularity of the aggregation mechanism is further increased in the gaming architecture with multi-threading.

Figure 11:
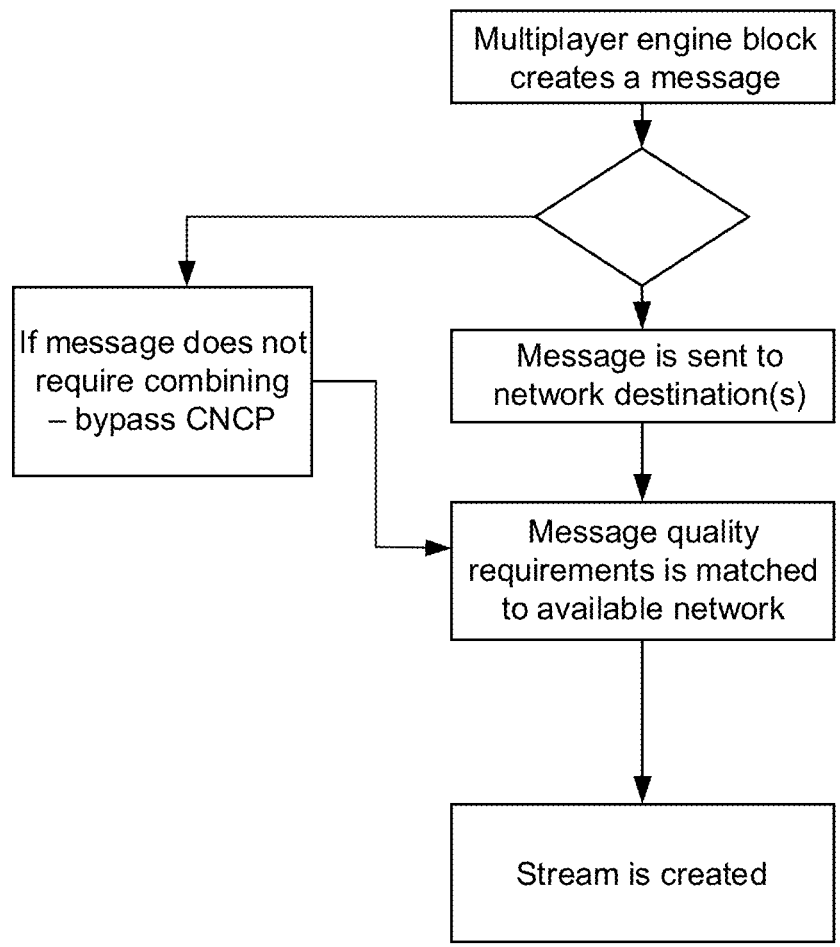
FIG. 11 illustrates message flow in a gaming client in accordance with an embodiment of the invention.

The flow depicted in FIG. 9 considers several different modes of action. Typically, if the control signal stands on its own, there is no requirement to send it through a CNCP. The control signal is then sent to the destination using the chosen access interface. Otherwise, the CNCP performs the combining functionality to provide the message intact to the destination. This process is depicted in FIG. 11, where the stream creation procedure is illustrated.

Further, in this regard, data splitter/combiner module 114 of system 100 is used for splitter allocation for low latency emergency and data intensive services that utilize cellular networks, such as 5G, and other networks including Wi-Fi, such as the public safety network. A session is divided into blocks and the blocks are sent to multiple networks with identification in the splitting and the receiving end combines the blocks into a single session.

In accordance with an embodiment, a multimedia splitting methodology along with best effort session scheme is described. Multimedia splitting is defined as decomposition of image files into crucial and less crucial parts, wherein crucial parts are sent over a low latency network and less crucial parts are sent over a high capacity network. This is adaptable and can change over time according to topology. In accordance with another embodiment, the methodology is used for uplink and downlink schemes and for broadcast communication, and where information is flooded over networks, for instance, in public safety networks.

Also, efficient public safety networks are needed not only to provide enough bandwidth when needed, but also to reduce the latency in immediate conditions. For these reasons, governments and organizations involved in public safety and security are devoting interest to transition from existing narrowband wireless systems towards broadband. A prospective solution is adaptation of 5G and Wi-Fi to critical issues. Costs, timing, and spectrum availability for the deployment of a public safety network is demanding. Critical issues that impact public safety are also of importance. Current Public Safety networks are based on narrowband systems such as TETRA, which focus on advanced security features and specific functionalities.

In the context of the gaming application, multiple wireless networks with different QoS characteristics are considered. Multiple access in 5G networks is provided by frequency domain multiplexing. 5G networks can also utilize other non-3GPP or 3GPP networks to adjust rapid changes in demand distribution and other variable factors. Like cellular operators, system 100 is applicable to Wi-Fi networks of various kinds mostly utilizing IEEE 802.11 protocols.

Dedicated networks have low costs, involve rapid development, and can be kept state of the art. However, they may experience possible coverage holes and lack of redundancy. Also, traffic congestion and network downtime may be experienced. On the other hand, usage of commercial networks is resilient, secure, and available, with guaranteed QoS and full support of mission critical applications, including flexible coverage. However, it involves high costs and significant time is required to deploy such networks. Therefore, system 100 implements a hybrid usage of both dedicated and commercial networks along with required resource sharing policies and additional infrastructure when there are coverage holes. As a result, usage of different networks has become a necessity and part of the next generation heterogeneous networks.

Figure 12:
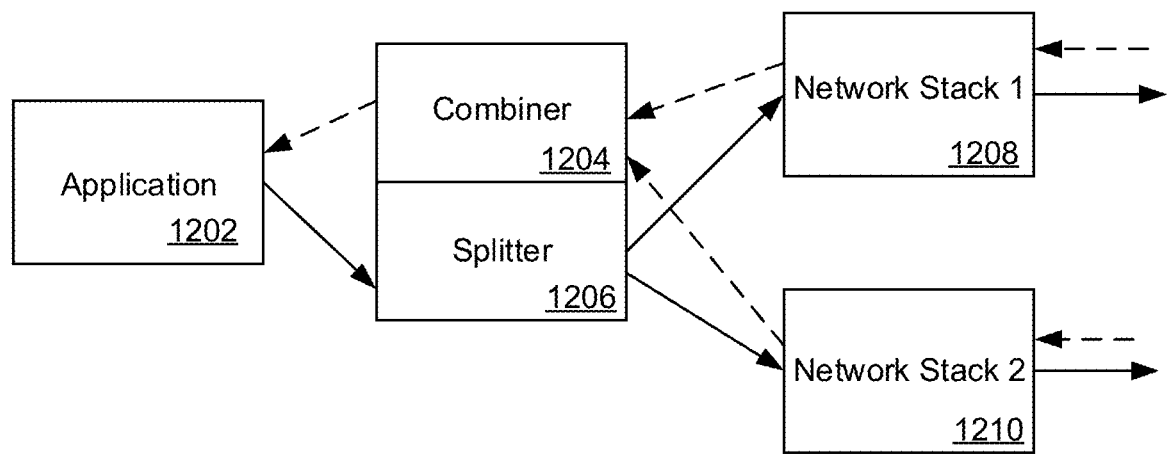
FIG. 12 illustrates combining and splitting mechanisms of the system in accordance with an embodiment of the invention.

FIG. 12 illustrates combining and splitting mechanisms of system 100 in accordance with an embodiment of the invention.

As illustrated in FIG. 12, if the destination of a content originates from an application 1202 at an access terminal hosting an ATSP that is simultaneously attached to the public safety network and the cellular network, and if the destination host is also simultaneously attached to the public safety network and the cellular network, the combining function for the content can be performed by the destination's Combiner 1204. However, if the destination host is attached only to the public safety network, then the combining is performed within the core network by the CNCP right before sending the content to the destination. Similarly, if the content is originating from a host that is attached only to the public safety network, then at the core network, the CNCP performs the splitting function of the content using a Splitter 1206, so that the content can be transmitted over two networks (1208 and 1210) towards the destination access terminal that is attached to both the networks.

Figure 13:
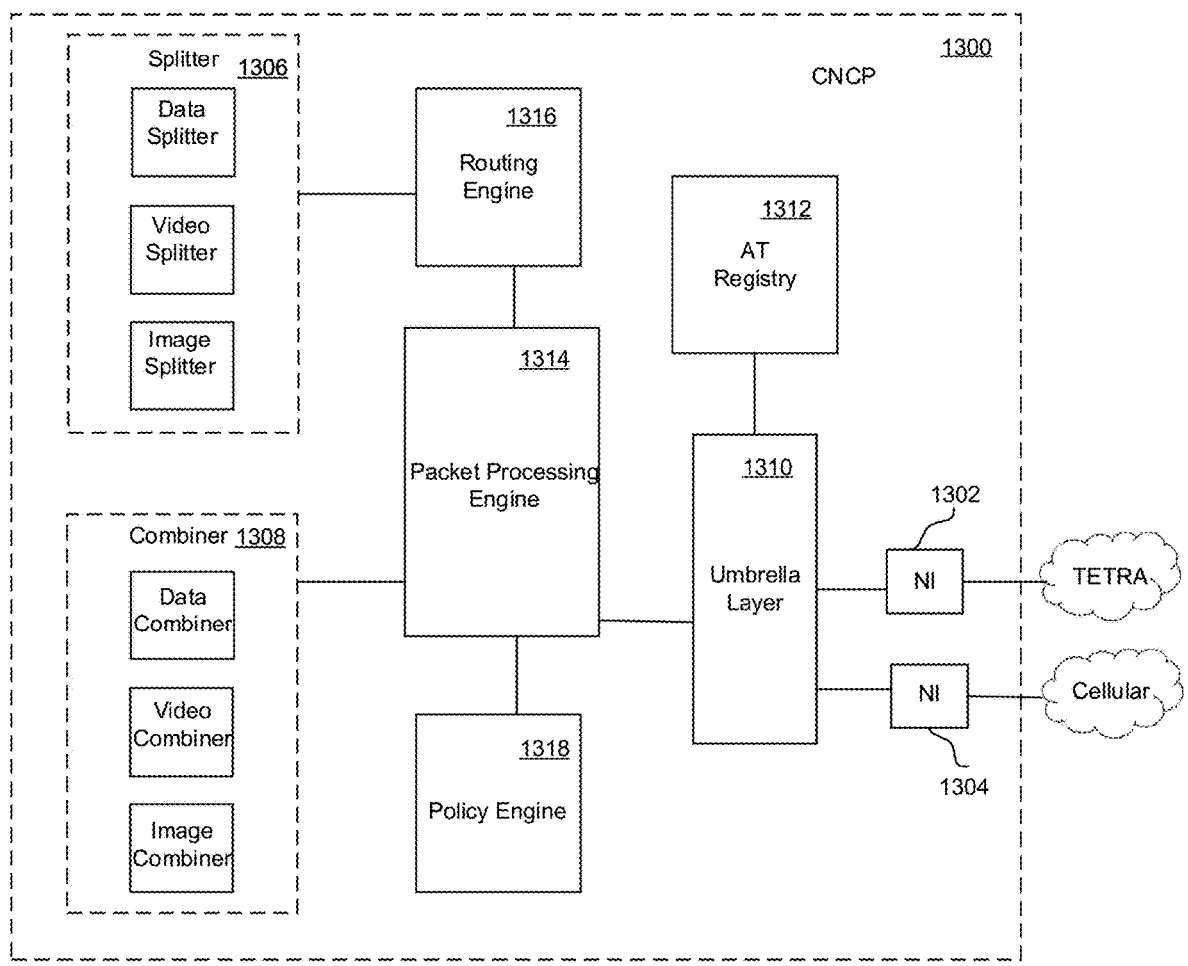
FIG. 13 illustrates a high-level block diagram of a Core Network Combiner and Splitter (CNCP) in accordance with an embodiment of the invention.

FIG. 13 illustrates a high-level block diagram of a CNCP 1300 in accordance with an embodiment of the invention.

As illustrated in FIG. 13, CNCP 1300 is attached to the core of TETRA and cellular networks with Network Interfaces NI 1302 and NI 1304, respectively. A Splitter 1306 and a Combiner 1308 perform splitting and combining of video, image, and other data traffic. An Umbrella Layer 1310 gathers network related performance information from NI 1302 and NI 1304. This information is used to determine how to dispatch split data streams onto different networks.

CNCP 1300 also has an Access Terminal (AT) Registry 1312 which maintains the information of all access terminals. The information can be, but need not be limited to, IP addresses and MAC addresses of the public safety network components, and whether the access terminals have the ATSP function or not. The key function of CNCP 1300 is a Packet Processing Engine 1314, which forwards each data packet to either Splitter 1306 or Combiner 1308, by simply inspecting the origination and destination IP addresses and checking them against a Routing Table that has proper forwarding instructions for data coming from or going to each access terminal that are in AT Registry 1312.

For example, if a data packet received from NI 1302 originated from IP address of an Access Terminal A and is destined to IP address of an Access Terminal C (referring to FIG. 5), Packet Processing Engine 1314 looks up its forwarding table and notices that Access Terminal A sends split data (because it has a resident ATSP function) but Access Terminal C has no combining function (because it is connected to the public safety network only). Thus, Access Terminal C has an instruction to forward any packet from Access Terminal A towards Combiner 1308, which in turn inspects the packet header information to identify if it is a video, image or data packet and also identifies which subfunction of Combiner 1308 to send it to for combining.

Combined data packets from Access Terminal A towards Access Terminal C are then routed back to the proper network interface via a Routing Engine 1316, which has the Routing Table for outgoing traffic. Optionally, CNCP 1300 may include a Policy Engine 1318, which contains rules for data processing priorities and policies for certain data streams. These policies are fed into Packet Processing Engine 1314. If the destination is another access terminal with ATSP function, then CNCP 1300 simply transmits the data packet as is to the destination's ATSP.

Figure 14:
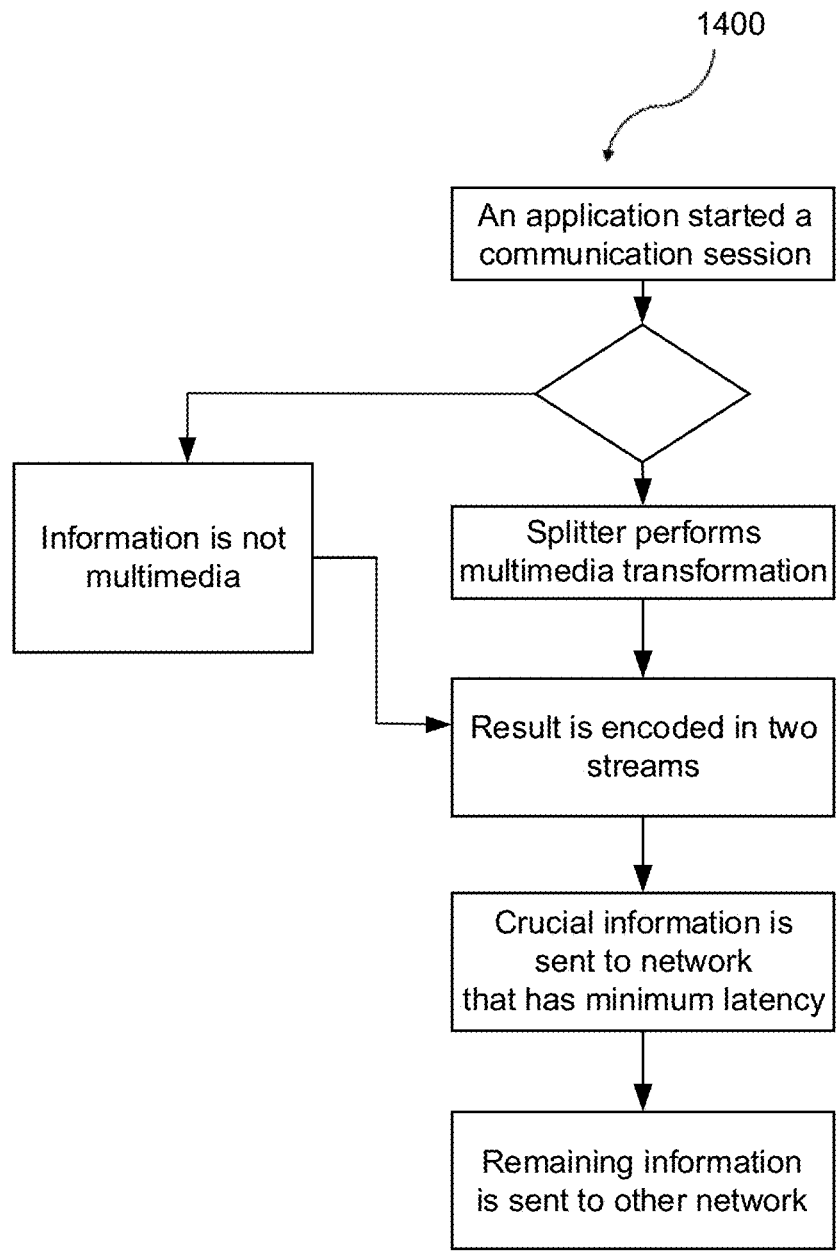
FIG. 14 illustrates a high-level flowchart of the splitting method/mechanism handled by an Access Terminal Combiner and Splitter (ATSP) in accordance with an embodiment of the invention.

FIG. 14 illustrates a high-level flowchart 1400 of the splitting method within an ATSP or a CNCP in accordance with an embodiment of the invention.

As illustrated in FIG. 14, the process starts when the application (local if it is an ATSP or remote if it is a CNCP) begins generating a stream of packets. The stream of packets is checked to determine if it is multimedia or not. If the application generates non-multimedia packets, the data is sent to a data splitter. If the application generates multimedia data, the data is checked to determine if the data is an image or a video. If the data is an image, the data is sent to a Joint Photographic Experts Group (JPEG) codec to encode a split image. If the data is a video, the data is sent to a scalable video coding and multiple description coding (SVC-MDC) codec to encode the video in split streams.

Figure 15:
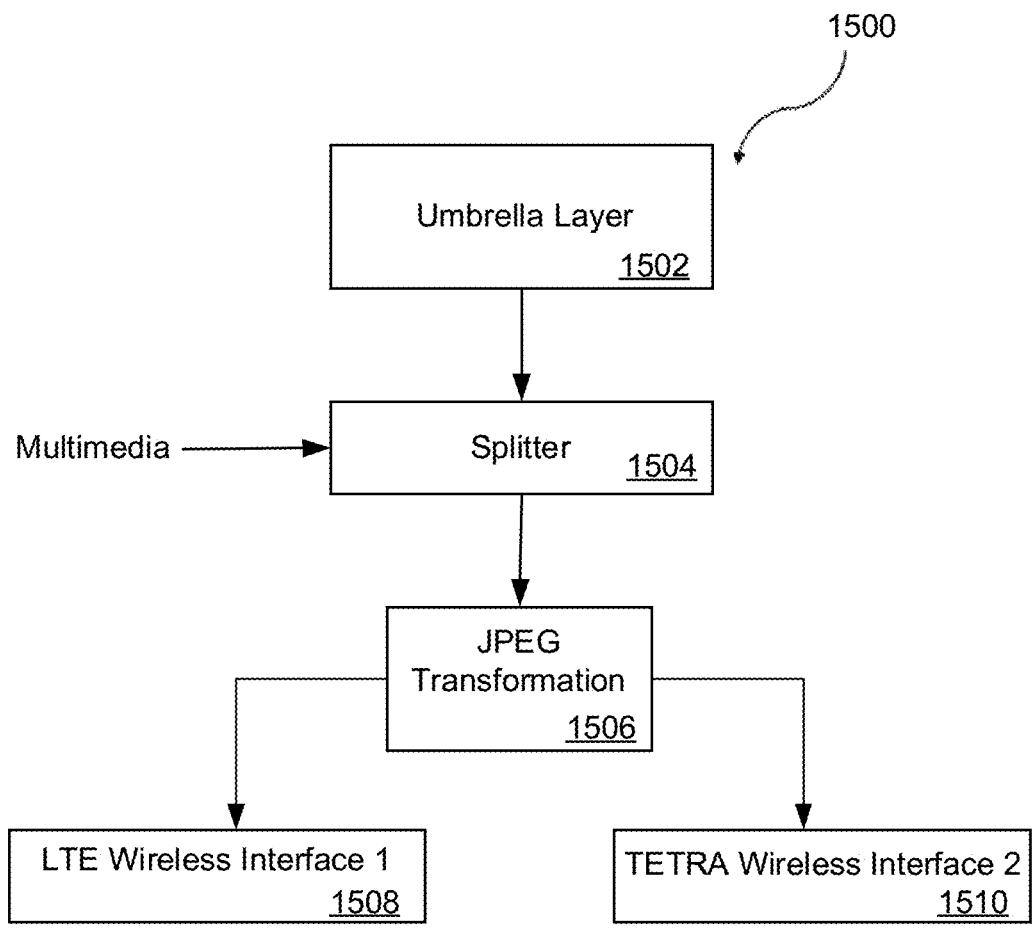
FIG. 15 illustrates a process of multimedia splitting in accordance with an embodiment of the invention.

FIG. 15 illustrates a high-level flowchart 1500 of multimedia splitting using JPEG transformation in accordance with an embodiment of the invention.

As illustrated in FIG. 15, an Umbrella Layer 1502 monitors the capabilities of both TETRA and cellular networks by collecting data from the respective network interfaces. Capabilities such as, but not limited to, packet latency, bandwidth and packet loss rate are processed and fed to a Splitter 1504. Subsequently, Splitter 1504 splits sessions and then bundles sessions according to the capabilities of the networks and the sessions are then subjected to a JPEG transformation 1506, which generates the sessions ready for sending to network interfaces 1508 and 1510. The sessions are sent to the network interfaces 1508 and 1510 and thereon to the associated networks for transport.

Also, image coding simplifies an encoder and transmits complexity from an encoder to a decoder. The images are coded with decimated versions using a JPEG coder with N/2 point Discrete Cosine Transform (DCT) and transmitted over two channels. At the receiver, when both descriptions exist, a high-quality image is reconstructed. On the other hand, if only the first description exists, the image has acceptable quality. This process does not introduce extra redundancy and the correlation between descriptions comes from the intrinsic correlation of spatial pixels. Further, this process has three components: Decimation, N/2 Point DCT, Quantization, Scanning and Entropy Coding.

Another example of multimedia splitting is to perform JPEG transformation more than two times but for two access interfaces. For instance, the main description is sent through cellular networks and other descriptions, which are smaller in size, are sent repeatedly from TETRA type of narrowband networks. Thus, image quality is increased over time, and current networks can also send a high-quality image by leveraging different networks.

In accordance with an embodiment, a multiple description video coding technique is described. There are methods that perform simple rate splitting or methods that calculate two simple parameters to characterize the smoothness and edge features of each block of a Moving Picture Experts Group (MPEG) video frame. These two parameters are used as a measure of the perceptual tolerance of DCT blocks against visual distortion. They duplicate the key information such as motion vectors and some low-frequency DCT coefficients and split the remaining DCT coefficients of prediction errors according to the calculated perceptual tolerance parameter. These are handled by a multiple description transmission system for MPEG video frames. Uplink directs this method and considers rate splitting as the default method when capacity, jitter and latency are adequate for transfers over both connections, and the coding takes care of smoothness and edge features. In this way, best of both coding techniques are utilized in a realistic wireless environment. In this context, approaches to basic splitting are explained as follows.

Figure 16:
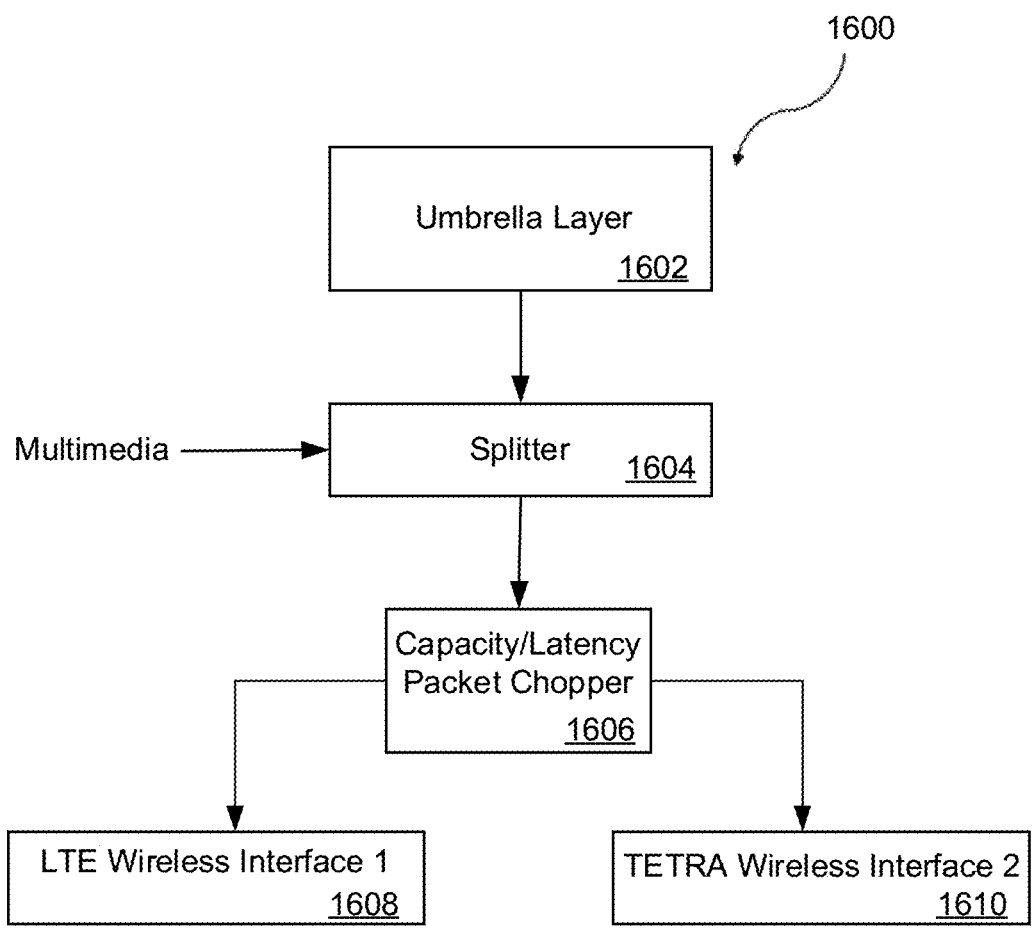
FIG. 16 illustrates a process of non-multimedia splitting in accordance with an embodiment of the invention.

FIG. 16 illustrates a process of non-multimedia splitting in accordance with an embodiment of the invention.

As illustrated in FIG. 16, an Umbrella Layer 1602 monitors the capabilities of both TETRA and cellular networks by collecting data from the respective network interfaces. Capabilities such as, but not limited to, packet latency, bandwidth and packet loss rate are processed and fed to a Splitter 1604. When there is a non-multimedia information, Splitter 1604 performs an optimized packet level procedure to utilize the best of both channels. From the uplink, Splitter 1604 receives the necessary capacity and latency information and splits the packets with respect to this information. Hence, in one wireless interface a packet can have a different size and is transmitted in different timing. For instance, if one of the wireless interfaces is TETRA, which is a narrowband system, packet sizes are smaller but with reduced sending times. On the other hand, if the other wireless interface is cellular, then packet sizes are increased. This also lets Splitter 1604 perform a real-time statistical splitting scheme to adaptively chop the packet sizes using a Capacity/Latency Packet Chopper 1606 for different wireless interfaces. The packets are then sent to network interfaces 1608 and 1610 and thereon to the associated networks for transport. In addition, approaches to broadcast and reliable splitting are explained as follows.

In certain cases, there may be a broadcast message that is originated in an access terminal to be distributed to other access terminals. Splitter 1604 utilizes both network (wireless) interfaces 1608 and 1610 to produce a broadcast message. Splitter 1604 also replicates packets with different packet sizes and jitter according to the information from the uplink, wherein each packet is tagged in the newly created header. Other mobile terminals also receive the packets from their dual interfaces to construct the information with a combiner. In this context, the combining procedure is explained as follows.

Figure 17:
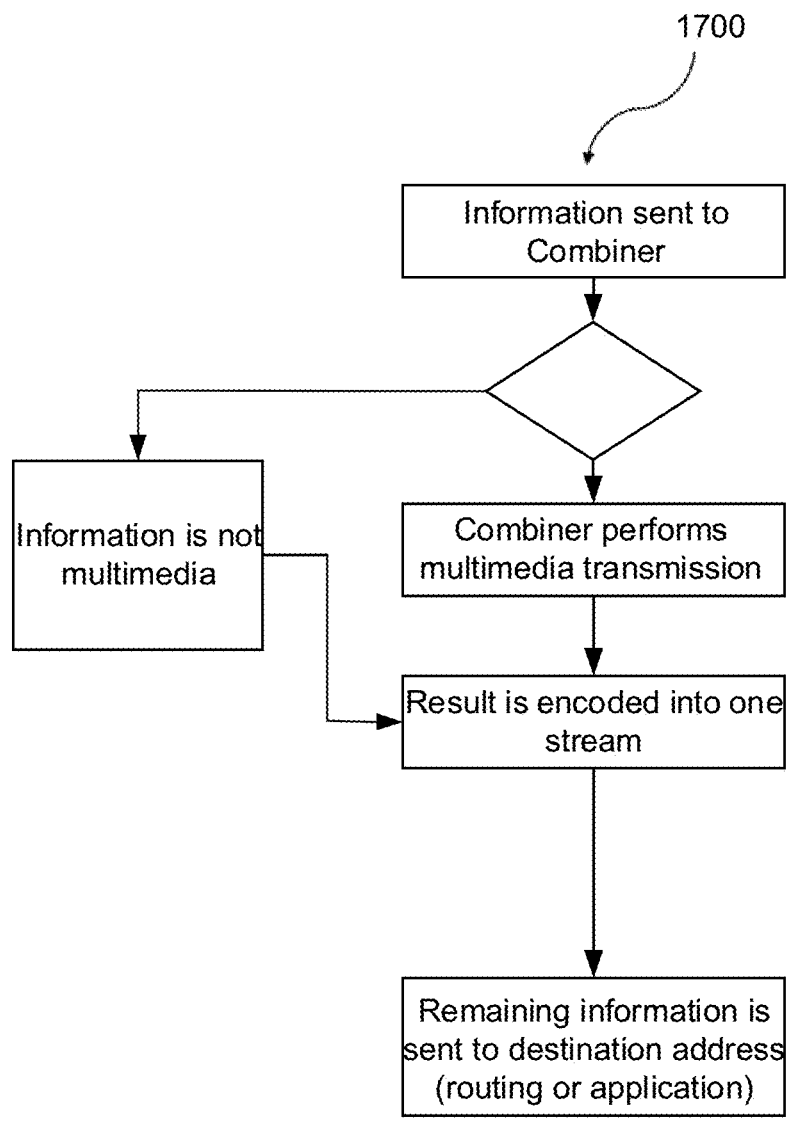
FIG. 17 illustrates a high-level flowchart of the combining method/mechanism handled by the CNCP in accordance with an embodiment of the invention.

FIG. 17 illustrates an overall process of a combining mechanism 1700 handled by a CNCP in accordance with an embodiment of the invention.

As illustrated in FIG. 17, combining mechanism 1700 can be divided into two parts: the multimedia combining and the basic combining. The procedure for multimedia combining is explained as follows.

Upon receiving one description, the description is decoded and then interpolated to reconstruct an image with acceptable quality. When two descriptions are received, both the descriptions are decoded and appropriately combined to regenerate a high-quality image. In this process, image interpolation is performed using different interpolation algorithms.

If the destination is another mobile station, the CNCP transmits packets as is to destination ATSP. In this situation, if there are missing packets, the CNCP can ignite retransmission but does not delay the transmission of the received packet to destination ATSP. When destination ATSP recognizes the missing packet and ignites retransmission, the CNCP sends a response. Also, the ATSP does not delay the transmission of the received image description to the application layer.

The combiner (CNCP) performs combining in an orderly fashion to sort the packets with respect to its tags. If any packet is missing, the combiner initiates the recovery mechanism in Transmission Control Protocol (TCP), Real-time Transport Protocol (RTP) or User Datagram Protocol (UDP). In some cases, the combiner transmits erroneous packets to the destination to allow the destination to ignite the retransmission.

For the downlink, when a data communication is directed to a particular mobile station, the CNCP performs splitting procedures 1400, 1500 and 1600 to utilize multiple networks the mobile station is attached to. When packets are received from multiple network interfaces, ATSP performs the related combining procedures. CNCP also has an uplink layer to incorporate different latency, jitter, and capacity of network interfaces. These rules can be generalized, and a service provider can configure these rules appropriately according to the topology and utilization.

Figure 18:
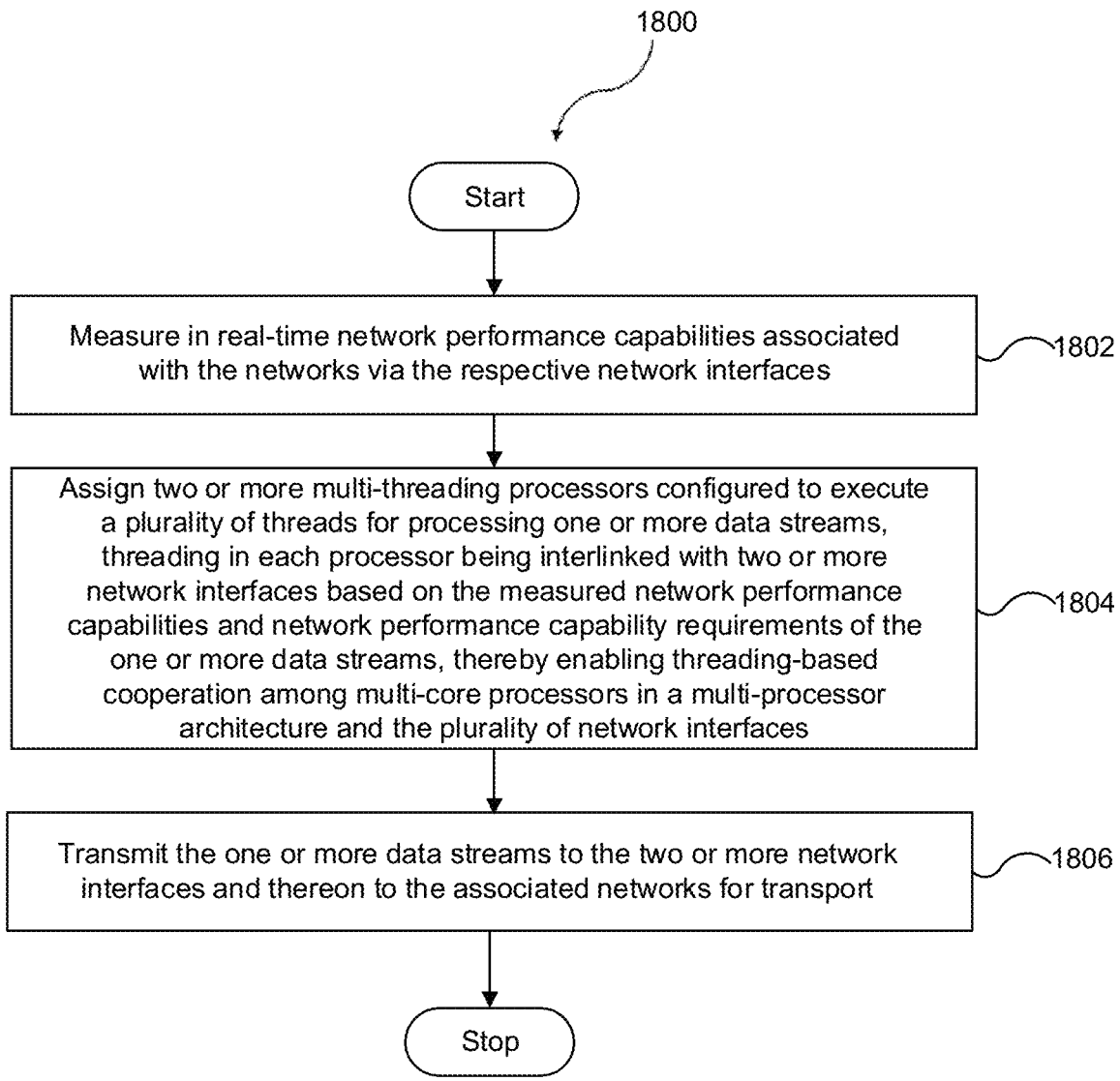
FIG. 18 illustrates a flowchart of a method for enabling low-latency data communication by aggregating a plurality of network interfaces in accordance with an embodiment of the invention.

FIG. 18 illustrates a flowchart of a method 1800 for enabling low-latency data communication by aggregating a plurality of network interfaces using multi-interface network aggregator 108 in accordance with an embodiment of the invention.

Each network interface of the plurality of network interfaces is associated with a different network, such as, but not limited to, a TETRA network, a wireless network (Wi-Fi network), a cellular network (LTE, 5G, 6G), a CBRS network and a public safety network.

As illustrated in FIG. 18, at step 1802, network performance monitoring module 110 measures in real-time, network performance capabilities associated with the networks via the respective network interfaces. Each network of the plurality of networks is associated with different QoS profiles/characteristics based on QoS metrics such as, but not limited to, packet latency, bandwidth, throughput, jitter, and packet loss rate.

At step 1804, multi-threading module 112 assigns two or more multi-threading processors in a multi-processor architecture configured to execute a plurality of threads for processing one or more data streams. Data splitter/combiner module 114 enables a multi-interface network aggregation-based data splitter/combiner to decompose the one or more data streams over the two or more multi-threading processors, by threading a single function to operate on two or more data blocks corresponding to the one or more data streams at the same time. The multi-interface network aggregation-based data splitter/combiner can be, but need not be limited to, (i) an API/application coded on the user-equipment (UE), (ii) an access terminal splitter/combiner, (iii) a core network splitter/combiner, or (iv) a combination thereof.

The threading in each processor is interlinked with two or more network interfaces based on the measured network performance capabilities and network performance capability requirements of the one or more data streams, thereby enabling threading-based cooperation among multi-core processors in the multi-processor architecture and the plurality of network interfaces. Each multi-threading processor comprises one or more functional blocks running a block of code which accesses one or more data blocks, wherein functional blocks are matched with two or more network interfaces based on data dependencies, processor usage and network performance capability requirements. The functional blocks that access same data blocks execute on the same thread and are interlinked with a same set of network interfaces.

The threading-based cooperation among multi-core processors in the multi-processor architecture and the plurality of network interfaces is performed via the multi-interface network aggregation using AI module 116. In case data streams are destined to a single user over a single server, an API/application coded on the UE handles the threading-based data transmissions/receptions via the multi-interface network aggregation. Otherwise, the procedure is performed by either an access terminal splitter/combiner, a core network splitter/combiner, or both.

At step 1806, the one or more data streams are then transmitted to the two or more network interfaces and thereon to the associated networks for transport.

In an embodiment, the convolutional coding mechanism predicts lost or delayed data at the receiving end. The prediction operation is performed at a sending end as on the receiving end, thereby ensuring continuity of communication within very low (near-zero) latency. The prediction operation further includes continuously analyzing whether the predicted data at the sending end is the same as the actual data while the data is already being created at the sending end. In the event the actual data being produced at the sending end and the predicted data at the sending end are the same, a signal with a minimum number of bits is transmitted to the receiving end indicating that the prediction is successful instead of transmitting the actual data over the network. In the event the actual data being produced at the sending end and the predicted data at the sending end are not the same, a preliminary signal is transmitted to the receiving end indicating the event, before the actual data is transmitted over the network, wherein upon receiving the preliminary signal, the receiving end updates its prediction according to the information in the signal, and dynamically adjusts timeout (latency adaptation time) required for the acquisition of real data.

In another embodiment of the invention, a multi-interface network aggregation-based slicing of the plurality of network interfaces to a plurality of slides is enabled. Applications are allowed to use two or more slides of the plurality of slides at once for different parts of the transmission based on linking QoS requirements of the different parts of the transmission and QoS profiles/characteristics of each slide of the plurality of slides. The multi-interface network aggregation-based slicing is enabled using NFV and SDN. The NFV provides the separation of network functions from hardware infrastructure and the SDN provides an architectural framework, wherein control and data planes of the SDN are decoupled, and direct programmability of network control is enabled through software-based controllers.

The present invention is advantageous in that it provides a novel object-aware wireless aggregation based fast data transmission and prediction framework for Tactile Internet communication, for the minimization of end-to-end latency. The invention further provides a novel control signaling based coding scheme for smart data prediction and correction in case latency occurs in a communication system. Hence, zero latency performance is achieved without zero latency communication systems for certain Tactile Internet communication.

To further improve efficiency of a communication system, the invention enables a smart data combiner/splitter allocation and threading-based cooperation among multi-core processors and multi-access wireless interfaces.

Therefore, the key embodiments of the invention propose three key approaches. Firstly, a novel convolutional coding mechanism is implemented to introduce new control signaling with previous and current control signaling. A soft decision mechanism at the receiver-end considers the possible sequential patterns to decode the errors or missing control information. Secondly, a threading-based multiple wireless interface allocation for multi-processor architecture is introduced. In this case, functional and data blocks placed in different processors are interlinked with multiple wireless interfaces with respect to the QoS levels they require. Finally, a multimedia splitting/combining methodology along with best effort session scheme is implemented, wherein a session is divided into blocks and blocks are sent to multiple networks with identification in the splitting and the receiving end combines the blocks into a single session.

The invention also provides minimal latency for shadow like robots with haptic devices where the only communication required is control signaling not multimedia, multi-player online gaming based on multi-core processors and multi-access wireless interfaces, and low latency emergency and data intensive services. Further, the invention is easy to launch across service providers and enterprise infrastructures and can be easily integrated into any mobile device/terminal and does not require significant time or cost to set up.

Further, the invention helps in achieving greater accuracy and efficiency in Tactile Internet communication. The invention utilizes the novel coding scheme for control signaling in haptic-based Tactile Internet. This coding aims to introduce correction in case latency occurs in the communication system. The invention also introduces mechanisms to avoid many potential hurdles in networks that do not have zero latency communication. Typically, forward error correcting codes in communication introduces redundancy, yet the present invention provides correcting the memory, and a receiver matches this with the possible movement patterns of the human body, and a cycle of movement patterns.

Also, the present invention is designed to introduce a method for critical applications such as, but not limited to, gaming, to leverage multiple networks using an object aware multiple description method.

Furthermore, the invention is compatible with, and makes use of approaches such as, but not limited to, shorter TTIs, dynamic spectrum sharing (DSS), NFV, SDN, tunable and coordinated FDM, and the physical specifications such as higher and wider frequency bands, new CBRS spectrum, and latest 802.11be and 6G standards, to be able to provide networks and terminals with Tactile Internet communication opportunity. The invention is also compatible with the uplink-downlink decoupling, also known as uplink sharing, which is standardized by the 3GPP. In this context, as a result of the invention working together with the uplink-downlink decoupling, not only is the optimization of 5G achieved through reusing existing 4G LTE resources, including base stations and spectrum bands, but also bottleneck of the higher spectrum coverage is eliminated.

The invention also enables new interactions and business models almost in any field, accessible by the information and communication technologies, as it is able to work over all kinds of clouds such as, but not limited to, standard-cloud, edge-cloud, and AR-cloud, utilize multi-interface networking/slicing structure (such as, but not limited to, Wi-Fi, cellular, CBRS, and public safety networks) and provide near-zero latency for Tactile Internet communication.

Those skilled in the art will realize that the above recognized advantages and other advantages described herein are merely exemplary and are not meant to be a complete rendering of all of the advantages of the various embodiments of the present invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense, and all such modifications are intended to be included within the scope of the present invention.

What is claimed is:

1. A method for enabling low-latency data communication by aggregating a plurality of network interfaces, wherein each network interface of the plurality of network interfaces is associated with a different network of a plurality of networks, the method comprising:
measuring in real-time network performance capabilities associated with the networks via the respective network interfaces;
assigning at least two multi-threading processors configured to execute a plurality of threads for processing one or more data streams, threading in each processor being interlinked with at least two network interfaces based on the measured network performance capabilities and network performance capability requirements of the one or more data streams, to enable threading-based cooperation among multi-core processors in a multi-processor architecture and the plurality of network interfaces; and
transmitting the one or more data streams to the at least two network interfaces to transport over the associated networks,
wherein measuring network performance capabilities comprises associating each network of the plurality of networks with different Quality-Of-Service (QoS) profiles or characteristics based on QoS metrics, and wherein a QoS metric is at least one of a packet latency, bandwidth, throughput, jitter and packet loss rate.

2. The method of claim 1, wherein the low-latency data communication is performed between one of a RAN (Radio Access Network)-based wireless front-haul communication and a wired back-haul communication.

3. The method of claim 1, wherein a network is one of a Terrestrial Trunked Radio (TETRA) network, a wireless network (Wi-Fi network), a cellular network (LTE, 5G, 6G), a Citizens Broadband Radio Service (CBRS) network and a public safety network.

4. The method of claim 1, wherein the step of measuring network performance capabilities is performed by an umbrella layer.

5. The method of claim 1, wherein each multi-threading processor comprises at least one functional block running a block of code which accesses one or more data blocks, wherein functional blocks are matched with at least two network interfaces based on data dependencies, processor usage and network performance capability requirements.

6. The method of claim 5, wherein functional blocks that access same data blocks execute on the same thread and are interlinked with a same set of network interfaces.

7. The method of claim 1, wherein the assigning comprises enabling a multi-interface network aggregation-based data splitter/combiner to decompose the one or more data streams over the at least two multi-threading processors, by threading a single function to operate on two or more data blocks corresponding to the one or more data streams at the same time.

8. The method of claim 7, wherein the multi-interface network aggregation-based data splitter/combiner is either an Application Programming Interface (API)/application coded on the user-equipment (UE), an access terminal splitter/combiner, a core network splitter/combiner, or a combination of the API/application coded on the UE, the access terminal splitter/combiner, and the core network splitter/combiner.

9. The method of claim 7, wherein enabling threading-based cooperation among multi-core processors in the multi-processor architecture and the plurality of network interfaces is performed via the multi-interface network aggregation-based data splitter/combiner using Artificial Intelligence (AI).

10. The method of claim 9, wherein the multi-interface network aggregation-based data splitter/combiner performs splitting and bundling of the one or more data streams into a plurality of blocks according to the performance capabilities of the networks and transmits the plurality of blocks to the plurality of network interfaces for transport over the associated networks with identification in the splitting, and enables a receiving end to combine the plurality of blocks into a single session.

11. The method of claim 10, wherein the multi-interface network aggregation-based data splitter/combiner utilizes a convolutional coding mechanism which introduces control signaling with previous and current control signaling for data prediction and correction, wherein a soft decision mechanism at the receiving end considers the possible sequential patterns of a human being to decode errors or missing control information.

12. The method of claim 11 further comprises, predicting, by the convolutional coding mechanism, lost or delayed data at the receiving end, wherein the prediction operation is performed at a sending end as on the receiving end, thereby ensuring continuity of communication within very low (near-zero) latency, wherein the predicting further comprises continuously analyzing whether the predicted data at the sending end is the same as the actual data while the data is already being created at the sending end.

13. The method of claim 12, wherein in the event the actual data being produced at the sending end and the predicted data at the sending end are the same, transmitting a signal with a minimum number of bits indicating that the prediction is successful to the receiving end instead of transmitting the actual data over the network.

14. The method of claim 12, wherein in the event the actual data being produced at the sending end and the predicted data at the sending end are not the same, transmitting a preliminary signal to the receiving end indicating the event, before the actual data is transmitted over the network, wherein upon receiving the preliminary signal, the receiving end updates its prediction according to the information in the signal, and dynamically adjusts timeout (latency adaptation time) required for the acquisition of real data.

15. The method of claim 12, wherein the multi-interface network aggregation-based slicing is enabled using Network Function Virtualization (NFV) and Software Defined Networking (SDN), wherein the NFV provides the separation of network functions from hardware infrastructure and the SDN provides an architectural framework, wherein control and data planes are decoupled, and direct programmability of network control is enabled through software-based controllers.

16. The method of claim 1, wherein the transmitting further comprises enabling multi-interface network aggregation-based slicing of the plurality of network interfaces to a plurality of slides, wherein applications are enabled to use at least two slides of the plurality of slides at once for different parts of the transmission based on linking QoS requirements of the different parts of the transmission and QoS profiles/characteristics of each slide of the plurality of slides.

17. A system for enabling low-latency data communication by aggregating a plurality of network interfaces, wherein each network interface of the plurality of network interfaces is associated with a different network of a plurality of networks, the system comprising:
a memory;
a processor communicatively coupled to the memory, the processor configured to:
measure in real-time network performance capabilities associated with the networks via the respective network interfaces;
assign at least two multi-threading processors configured to execute a plurality of threads for processing one or more data streams, threading in each processor being interlinked with at least two network interfaces based on the measured network performance capabilities and network performance capability requirements of the one or more data streams, to enable threading-based cooperation among multi-core processors in a multi-processor architecture and the plurality of network interfaces; and
transmit the one or more data streams to the at least two network interfaces to transport over the associated networks,
wherein each multi-threading processor comprises at least one functional block running a block of code which accesses one or more data blocks, and wherein functional blocks are matched with at least two network interfaces based on data dependencies, processor usage and network performance capability requirements.

18. The system of claim 17, wherein a network is one of a Terrestrial Trunked Radio (TETRA) network, a wireless network (Wi-Fi network), a cellular network (LTE, 5G, 6G), a Citizens Broadband Radio Service (CBRS) network and a public safety network.

19. The system of claim 17, wherein the processor is configured to associate each network of the plurality of networks with different Quality-Of-Service (QoS) profiles/characteristics based on QoS metrics, wherein a QoS metric is at least one of a packet latency, bandwidth, throughput, jitter and packet loss rate.

20. The system of claim 17, wherein functional blocks that access same data blocks execute on the same thread and are interlinked with a same set of network interfaces.

21. The system of claim 17, wherein the processor is configured to enable a multi-interface network aggregation-based data splitter/combiner to decompose the one or more data streams over the at least two multi-threading processors, by threading a single function to operate on two or more data blocks corresponding to the one or more data streams at the same time.

22. The system of claim 21, wherein the multi-interface network aggregation-based data splitter/combiner is either an Application Programming Interface (API)/application coded on the user-equipment (UE), an access terminal splitter/combiner, a core network splitter/combiner, or a combination of the API/application coded on the UE, the access terminal splitter/combiner, and the core network splitter/combiner.

23. The system of claim 21, wherein the processor is configured to enable threading-based cooperation among multi-core processors in the multi-processor architecture and the plurality of network interfaces via the multi-interface network aggregation-based data splitter/combiner using Artificial Intelligence (AI).

24. The system of claim 23, wherein the multi-interface network aggregation-based data splitter/combiner performs splitting and bundling of the one or more data streams into a plurality of blocks according to the performance capabilities of the networks and transmits the plurality of blocks to the plurality of network interfaces for transport over the associated networks with identification in the splitting, and enables a receiving end to combine the plurality of blocks into a single session.

25. The system of claim 24, wherein the multi-interface network aggregation-based data splitter/combiner utilizes a convolutional coding mechanism which introduces control signaling with previous and current control signaling for data prediction and correction, wherein a soft decision mechanism at the receiving end considers the possible sequential patterns of a human being to decode errors or missing control information.

26. The system of claim 25, wherein the processor is configured to predict, by the convolutional coding mechanism, lost or delayed data at the receiving end, wherein the prediction operation is performed at a sending end as on the receiving end, thereby ensuring continuity of communication within very low (near-zero) latency, wherein the processor is further configured to continuously analyze whether the predicted data at the sending end is the same as the actual data while the data is already being created at the sending end.

27. The system of claim 26, wherein in the event the actual data being produced at the sending end and the predicted data at the sending end are not the same, the processor is configured to transmit a preliminary signal to the receiving end indicating the event, before the actual data is transmitted over the network, wherein upon receiving the preliminary signal, the receiving end updates its prediction according to the information in the signal, and dynamically adjusts timeout (latency adaptation time) required for the acquisition of real data.

28. The system of claim 26, wherein in the event the actual data being produced at the sending end and the predicted data at the sending end are the same, the processor is configured to transmit a signal with a minimum number of bits indicating that the prediction is successful to the receiving end instead of transmitting the actual data over the network.

29. The system of claim 17, wherein the processor is configured to enable multi-interface network aggregation-based slicing of the plurality of network interfaces to a plurality of slides, wherein applications are enabled to use at least two slides of the plurality of slides at once for different parts of the transmission based on linking QoS requirements of the different parts of the transmission and QoS profiles/characteristics of each slide of the plurality of slides.

30. The system of claim 29, wherein the multi-interface network aggregation-based slicing is enabled using Network Function Virtualization (NFV) and Software Defined Networking (SDN), wherein the NFV provides the separation of network functions from hardware infrastructure and the SDN provides an architectural framework, wherein control and data planes are decoupled, and direct programmability of network control is enabled through software-based controllers.

* * * * *